(12) United States Patent
Jones et al.

(10) Patent No.: US 7,428,208 B2
(45) Date of Patent: Sep. 23, 2008

(54) MULTI-SERVICE TELECOMMUNICATION SWITCH

(75) Inventors: John Patrick Jones, Westford, MA (US); Michael Paul Demilia, Sterling, MA (US); Ronald Mark Parker, Boxborough, MA (US); Mehmet Hakan Duymazlar, Nashua, NH (US)

(73) Assignee: Ciena Corporation, Linthicum, MD (US)

( * ) Notice: Subject to any disclaimer, the term of this patent is extended or adjusted under 35 U.S.C. 154(b) by 1289 days.

(21) Appl. No.: 10/277,023

(22) Filed: Oct. 21, 2002

(65) Prior Publication Data

US 2003/0081540 A1    May 1, 2003

Related U.S. Application Data

(60) Provisional application No. 60/336,030, filed on Oct. 31, 2001.

(51) Int. Cl.
*G01R 31/08* (2006.01)
(52) U.S. Cl. ........................... 370/216; 370/218
(58) Field of Classification Search ................. 370/401, 370/389, 352, 392
See application file for complete search history.

(56) References Cited

U.S. PATENT DOCUMENTS

| | | | | |
|---|---|---|---|---|
| 5,905,781 A * | 5/1999 | McHale et al. | ........... | 379/93.14 |
| 5,959,986 A * | 9/1999 | Nelson et al. | ............... | 370/351 |
| 6,711,357 B1 * | 3/2004 | Brewer et al. | ................. | 398/54 |
| 7,065,038 B1 * | 6/2006 | Brandt et al. | ............... | 370/219 |
| 7,177,919 B1 * | 2/2007 | Truong et al. | ............... | 709/220 |

FOREIGN PATENT DOCUMENTS

EP    0686284    6/1995

OTHER PUBLICATIONS

Aggarwal, Vijay, "Fully Distributed Switching: A Blueprint for the Future", *Gotham Networks White Paper* (7 pgs.), (2001).
Alcatel, "Alcatel 7670, Routing Switch Platform", (4 pgs.), (2000).
Alles, Anthony, "ATM Internetworking", (70 pgs.) [online], [Retrieved on Dec. 9, 2002]. *Retrieved from the Internet*: <URL:www.cisco.com/warp/public/614/12.html>.
The ATM Forum Technical Committee, "Utopia Specification Level 1, Version 2.01" (19 pgs.), (Mar. 21, 1994).
The ATM Forum Technical Committee, "Utopia Specification Level 2, Version 1.0" (69 pgs.), (Jun. 1995).

(Continued)

*Primary Examiner*—Chau Nguyen
*Assistant Examiner*—Dargaye H Churnet
(74) *Attorney, Agent, or Firm*—Clements Bernard Miller; Christopher L. Bernard; Tyler S. Brown

(57) ABSTRACT

Multi-service telecommunication switches which include enhanced component redundancy and which also allow multiple chassis connections to a switching fabric enhance the likelihood that packets transmitted to and from the switch will not be lost due do a particular component failure and also enable chassis stacking in a rack system. Such a multi-service telecommunication switch includes redundant physical layer adapter cards, redundant service cards, redundant timing modules, and redundant switching fabrics. Further, the multi-service telecommunication switch, includes an enhanced data flow distribution (load-balancing) architecture which enables multiple chassis connections to the switching fabrics.

14 Claims, 18 Drawing Sheets

OTHER PUBLICATIONS

"AXD 301", (2 pgs.) [online], [Retrieved on Jun. 5, 2001]. *Retrieved from the Internet*: <URL:www.ericsson.com/datacom/products/wan_core/axd301/index.shtml>.

King, T.J., "Advances in Data Networking", *BT Technology Journal* vol. 16, No. 1, 9-15, (Jan. 1998).

Kohalmi, et al., "Anatomy of an IP Service Edge Switch", *Quarry Technologies, Inc. White Paper* (10 pgs.), (2001).

Kurbangulov, "ATM Switch Architecture", (2 pgs.) [online], [Retrieved on Dec. 9, 2002]. *Retrieved from the Internet*: URL:www.sci.pfu.edu.ru/telesys/studwork/telfut96/lsdn/switch/structur.html.

Lucent Technologies, "GX 550: Multiservice Physical Interface Modules" (2 pgs.), (2000).

Multiservice Switching Forum, "System Architecture Implementation Agreement" (81 pgs.), (May 23, 2000).

"Alleviating the Pain in Today's Edge Networks", *Telechoice, Inc. White Paper*, (21 pgs.), (Oct. 2000).

Unisphere Networks, "Company Overview", (2 pgs.) [online], [Retrieved on Jun. 6, 2001]. *Retrieved from the Internet*: URL:www.unispherenetworks.com/Company Overview.html.

\* cited by examiner

MULTI-SERVICE TELECOMMUNICATION SWITCH

CROSS REFERENCE TO RELATED CASE

This claims priority to and the benefit of Provisional U.S. Patent Application Ser. No. 60/336,030 filed Oct. 31, 2001, the entirety of which is hereby incorporated by reference.

TECHNICAL FIELD

The invention relates generally to network switches and more particularly to multi-service telecommunication switches.

BACKGROUND INFORMATION

A fundamental concept of telecommunications involves transferring information, which may, for example, be voice, video, and/or data, between two endpoints through a telecommunication network. A telecommunication network includes links (or communication channels), and nodes, which are the points of interconnection for the links within the network. Generally, a typical telecommunications network includes core networks and edge networks. A core network includes devices that communicate information at high speeds between different edge networks. An edge network, which resides at a border of the telecommunications network, connects the end user to the core network.

A typical edge network includes central offices linked to each other via interoffice links. A central office may function as an end office or a tandem office depending on the central office's location in the edge network. An end office is a connection point within the edge network between at least one tandem office and end users. A tandem office is a connection point within the edge network between at least one end office and at least one point of presence (POP) switch. An end office includes edge devices, such as local switches, which connect end users to tandem offices. A tandem office includes a tandem switch. A tandem switch connects at least one end office to at least one point of presence (POP) switch. A POP switch is an information gateway between at least one end office (via a tandem switch) and at least one core network. A tandem switch is capable of transmitting and receiving information from network services that conform to a variety of protocols, such as asynchronous transfer mode (ATM), time division multiplexing (TDM), frame relay (FR), and internet protocol/multiprotocol label switching (IP/MPLS), for example.

SUMMARY OF THE INVENTION

The invention relates to a multi-service telecommunication switch that includes redundant components and facilitates multiple connections to a switching fabric. The multi-service telecommunication switch is capable of transmitting and/or receiving information (such as voice, video, and/or data) from various network services (such as telephone, digital subscriber lines, cable modems, and dial-up modems, for example) that operate according to a variety of protocols, such as asynchronous transfer mode (ATM), time division multiplexing (TDM), frame relay (FR), and internet protocol/multiprotocol label switching (IP/MPLS), for example.

In one aspect, the invention involves a telecommunication switch. The telecommunication switch includes a service card for processing a plurality of packets. The telecommunication switch further includes a first physical layer adapter card for transmitting and receiving the plurality of packets. The first physical layer adapter card is in communication with a network over a first link and the service card over a second link. The second link is for transferring the plurality of packets between the first physical layer adapter card and the service card. The telecommunications switch further includes a second physical layer adapter card for transmitting and receiving the plurality of packets. The second physical layer adapter card is in communication with the network over the first link and the service card over a third link. The third link is for transferring the plurality of packets between the second physical layer adapter card and the service card and thereby provides redundant functionality for the first physical layer adapter card.

According to one feature, the service card is a first service card and the telecommunication switch includes a second service card for processing the plurality of packets. The second service card is in communication with the first physical layer adapter card over a fourth link. The fourth link is for transferring the plurality of packets between the second service card and the first physical layer adapter card. The second service card is also in communication with the second physical layer adapter card over a fifth link. The fifth link is for transferring the plurality of packets between the second service card and the second physical layer adapter card, thereby providing redundant functionality for the first service card.

According to another feature, the telecommunication switch includes a first timing module for providing a plurality of timing signals. The first timing module is in communication with the first service card over a sixth link and is in communication with the second service card over a seventh link. The telecommunication switch includes a second timing module for providing the plurality of timing signals. The second timing module is in communication with the first service card over an eighth link and is in communication with the second service card over a ninth link, thereby providing redundant timing functionality for the first timing module.

According to still another aspect, each of the first and second physical layer adapter cards may include four port DS3, four port OC3, one port OC12, one port OC48, four port OC12, and/or twelve port DS3 physical layer adapter cards, as well as any other appropriate port adapter cards. The service cards include high speed cell and packet forwarding module cards. The first and second timing modules include stack timing modules or fabric timing modules.

In another aspect, the invention involves a system for balancing data flow within a network switch. The system includes a service card for processing a plurality of packets and a first timing module. The first timing module includes an input interface and an output interface. The input interface of the first timing module is in communication with the service card over a first plurality of links. The first plurality of links are for transferring the packets between the service card and the first timing module. The system further includes a second timing module that includes an input interface and an output interface. The input interface of the second timing module is in communication with the service card over a second plurality of links for transferring the packets between the service card and the second timing module, thereby providing redundant functionality for the first timing module. The system still further includes a processor in communication with the first timing module and the second timing module. The processor controls data flow between the first timing module input and output interfaces, and between the second timing module input and output interfaces by balancing the transfer of the plurality of packets between the first plurality of links and the second plurality of links depending on the integrity of the first and second pluralities of links.

According to one aspect, the service card is a first service card. The system includes a second service card for processing the plurality of packets. The second service card is in communication with the input interface of the first timing module over a third plurality of links. The third plurality of links are for transferring the packets between the second service card and the first timing module. The second service card is also in communication with the input interface of the second timing module over a fourth plurality of links. The fourth plurality of links are for transferring the packets between the second service card and the second timing module. The processor controls data flow between the first timing module input and output interfaces, and between the second timing module input and output interfaces by balancing the transfer of the plurality of packets between the third plurality of links and the fourth plurality of links.

In another aspect, the invention involves a system for enabling chassis stacking in a rack system. The system includes a fabric that includes a first plurality of bi-directional fabric interfaces for transmitting and receiving a plurality of packets, and a second plurality of bi-directional fabric interfaces for transmitting and receiving the plurality of packets. The system further includes a plurality of chassis. Each of the plurality of chassis includes a first stack timing module which includes a bi-directional data interface in communication with one of the first plurality of fabric interfaces over a first plurality of links. The first plurality of links are for transferring the plurality of packets between the first stack timing module and the fabric. Each of the plurality of chassis also includes a second stack timing module which includes a bi-directional data interface in communication with one of the second plurality of fabric interfaces over a second plurality of links. The second plurality of links are for transferring the plurality of packets between the second stack timing module and the fabric.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF THE INVENTION

The invention relates to a multi-service telecommunication switch that includes redundant components and facilitates multiple connections to a switching fabric. The multi-service telecommunication switch, in one embodiment, resides in a tandem office located in an edge network and transfers information (such as voice, video, and/or data) between an end office and a point of presence (POP) switch. The multi-service telecommunication switch transmits and/or receives information from various network services (such as telephone, digital subscriber lines, cable modems, and dial-up modems, for example) that operate according to a variety of protocols, such as asynchronous transfer mode (ATM), time division multiplexing (TDM), frame relay (FR), and internet protocol/multiprotocol label switching (IP/MPLS), for example.

The multi-service telecommunication switch of the present invention includes redundant transmitting, receiving, and switching components. This component redundancy increases the likelihood that packets of information (packets), such as cells, frames, and/or datagrams, for example, transferred to and from the multi-service telecommunication switch will not be lost because of a particular switch component failure.

Implementation of the multi-service telecommunication switch is accomplished via a rack system. The rack system includes one or more chassis (shelves) which contain various components of the multi-service telecommunication switch. The multi-service tandem switch enables one or more than one stack chassis (shelf) to be connected to a switching fabric chassis (shelf). The one or more than one chassis are treated as a single node. In this configuration, the single node may be scaled up or down by adding or removing a stack chassis.

Figure 1A:
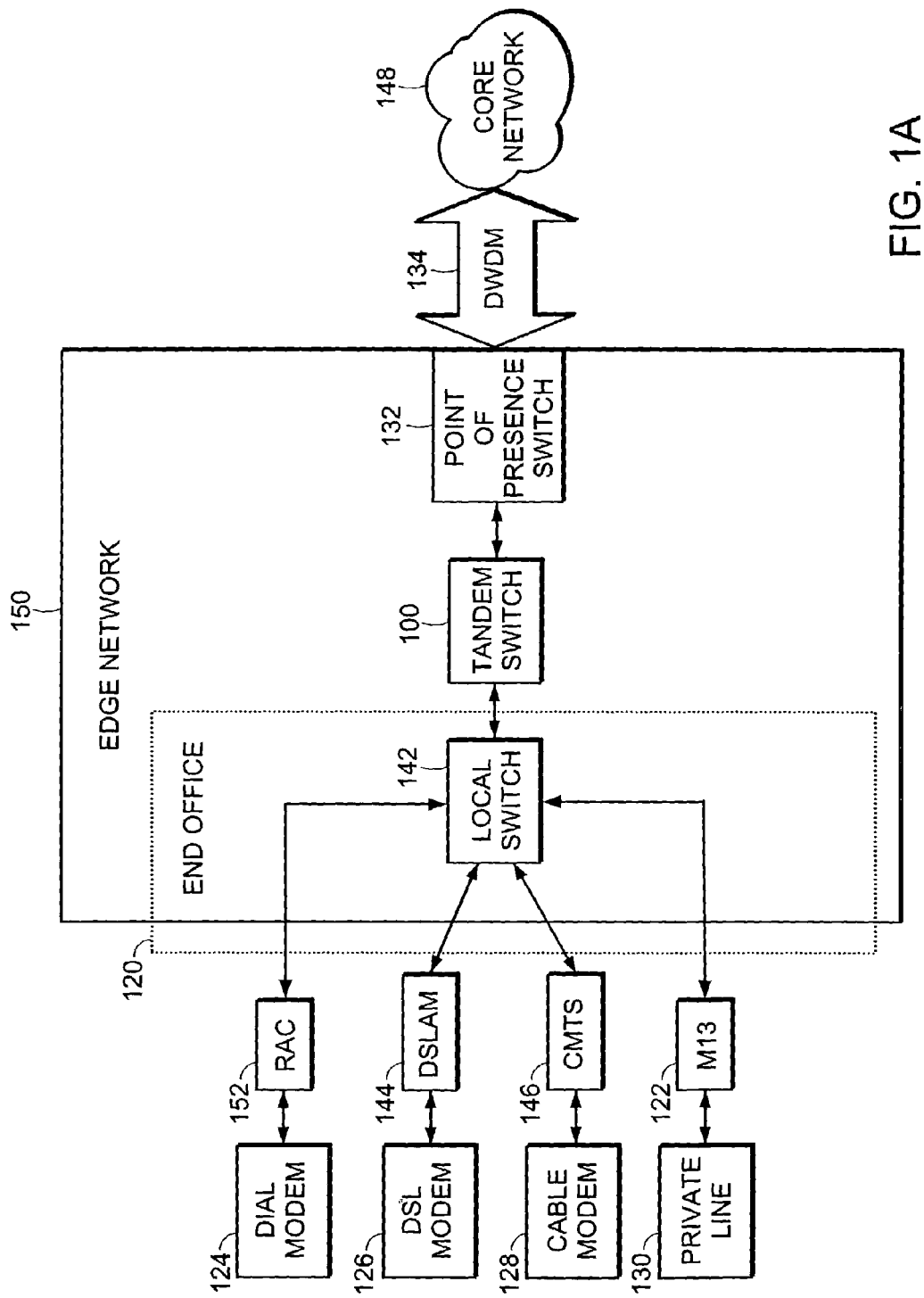
FIG. 1A is an illustrative diagram of an edge network including a multi-service tandem switch, according to one embodiment of the invention.

FIG. 1A shows an embodiment of an edge network 150. The edge network 150 includes at least one end office 120, at least one multi-service tandem office including a tandem switch 100, and at least one point of presence (POP) having a POP switch 132. The end office 120 includes a local switch 142, a routing and access controller (RAC) 152, a cable modem termination system (CMTS) 146, a digital subscriber line access multiplexor (DSLAM) 144, and an E1/T1/DS3 multiplexor (M13) 122. The RAC 152 transmits/receives packets to/from a dial-up modem 124. The DSLAM 144 transmits/receives packets to/from a digital subscriber line (DSL) modem 126. The CMTS 146 transmits/receives packets to/from a cable modem 128. The M13 122 transmits/receives packets to/from private communication lines 130. The RAC 152, DSLAM 144, CMTS 146, and M13 122 are each in communication with the local switch 142 and transmits/receives packets to/from the local switch 142. The local switch 142 transmits/receives packets to/from the tandem switch 100. The tandem switch 100 transmits/receives packets to/from the POP switch 132. The POP switch 132 is a gateway for packets, via a dense wave division multiplexor (DWDM) optical backbone 134, to/from a core (main) network 148.

Switch

The telecommunication switch of the present invention, in one embodiment, is the tandem switch 100 and includes a plurality of components including physical layer adapter cards, service cards, timing modules, and switching fabrics. Redundancy is implemented for each type of switch component, as described in detail below.

Figure 1B:
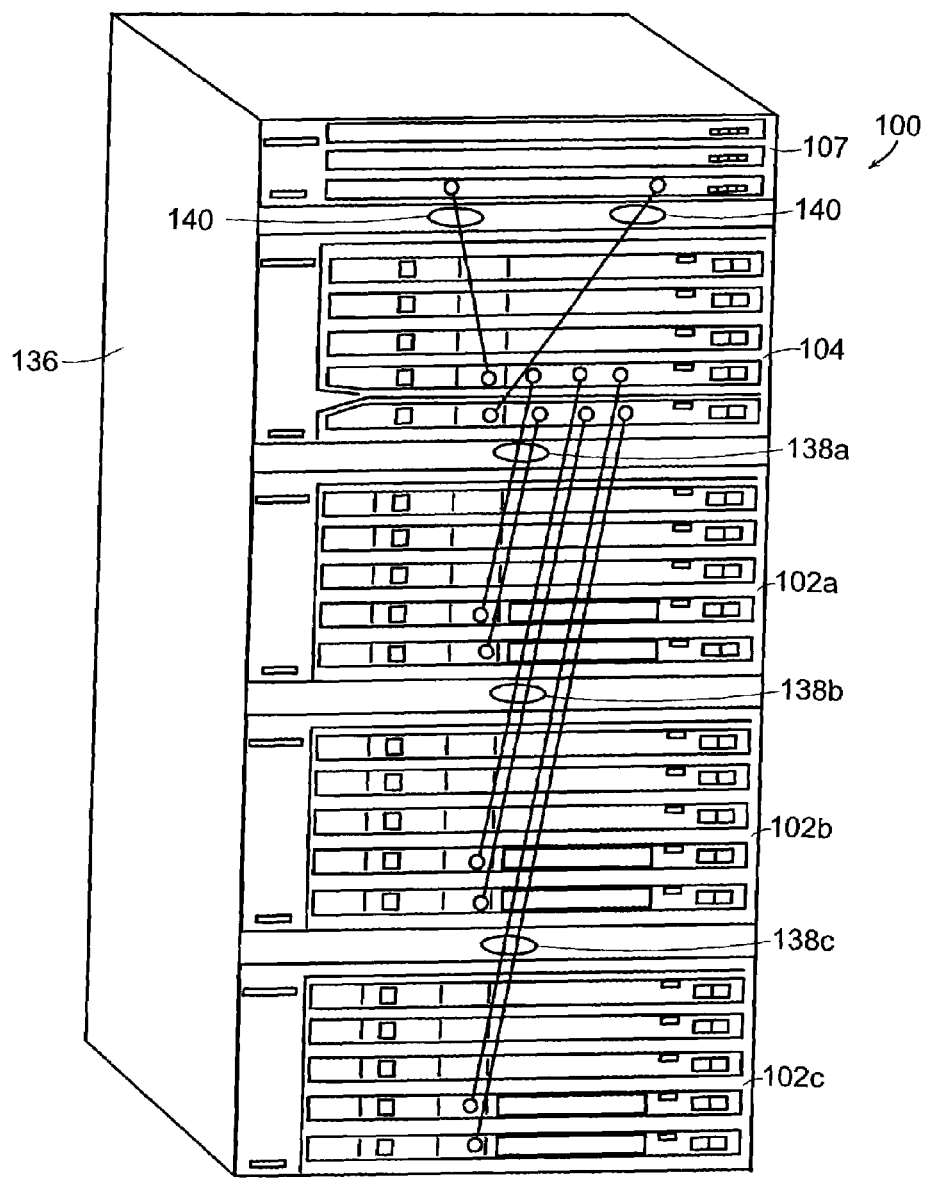
FIG. 1B is an illustrative diagram of a rack system including four stack chassis in communication with a fabric chassis, according to one embodiment of the invention.

In general, the tandem switch 100 is implemented in a rack system comprised of one or more shelves or chassis. Embodiments of the chassis include a 4U (6.9" H×17.3" W×17.7" D) chassis or a 2U (3.4" H×17.3" W×17.7" D) chassis. FIG. 1B shows an embodiment of the tandem switch 100 in a rack system 136 including three 4U stack chassis 102*a*, 102*b*, and 102*c* (generally 4U stack chassis 102), a 2U stack chassis 107, and a 4U fabric chassis 104. The stack chassis 102, 107 are used to transmit/receive information to/from the local switch 142 in the edge network 150. The stack chassis 102, 107 include stack timing modules that interface with the fabric chassis 104 and are discussed in further detail below. The fabric chassis 104 transmits and receives information to and from a POP switch 132. The fabric chassis 104 includes fabric timing modules which are used to interface with one or more stack chassis 102, 107 and is discussed in further detail below.

Each of the stack chassis 102*a*, 102*b*, 102*c* is in communication with the fabric chassis 104 via links 138*a*, 138*b*, 138*c*, respectively. The stack chassis 107 is in communication with the fabric chassis 104 via links 140. In other embodiments, more or fewer stack chassis 102, 107 may be included in the rack system 136. Regardless of the number of stack chassis 102, 107 in the rack system 136, the rack system 136 operates as a single node in the edge network 150. Adding or removing one or more stack chassis 102, 107 serves to scale the size of the node up or down. For example, one stack chassis 102 provides a bandwidth of 15 Gbps and four stack chassis 102 provide a bandwidth of 37.5 Gbps. In still another embodiment, the rack system 136 may include a single standalone (fabricless) 4U or 2U chassis and is described in further detail below.

Figure 2A:
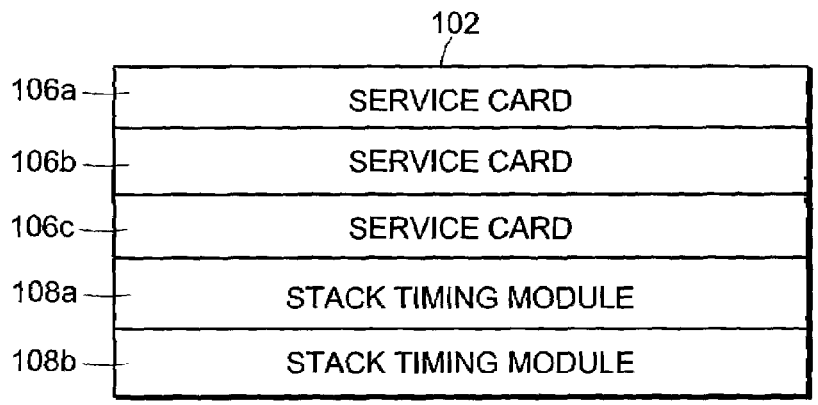
FIG. 2A is an illustrative diagram of a front view of a 4U (6.9 inches high) stack chassis, according to one embodiment of the invention.

FIG. 2A shows a front view of an embodiment of the 4U stack chassis 102 including service cards (also referred to as forwarding modules) 106*a*, 106*b*, 106*c* (generally service card 106), and stack timing modules 108*a*, 108*b* (generally stack timing module 108). Each of the service cards 106 and the stack timing modules 108 physically resides in slots within the stack chassis 102. The service cards 106 are in communication with the stack timing modules 108*a*, 108*b* and process packets. The service cards 106 also transfer the packets between PHY cards 112, 114 and the stack timing modules 108. The service card 106*a* (residing in slot 1 of the stack chassis 102) also functions as a chassis controller. The chassis controller (service card 106*a*) controls the functions of the entire stack chassis 102. The service card 106*b* (residing in slot 2 of the stack chassis 102) also functions as a backup chassis controller and takes over stack chassis 102 control if the service card 106*a* fails. The stack timing modules 108 provide timing signals to the components in the stack chassis 102, interface with fabric timing modules 110 (FIG. 2C) in the fabric chassis 104 (FIGS. 2C and 2D), and transfer packets between the stack chassis 102 and a fabric chassis 104.

Figure 2B:
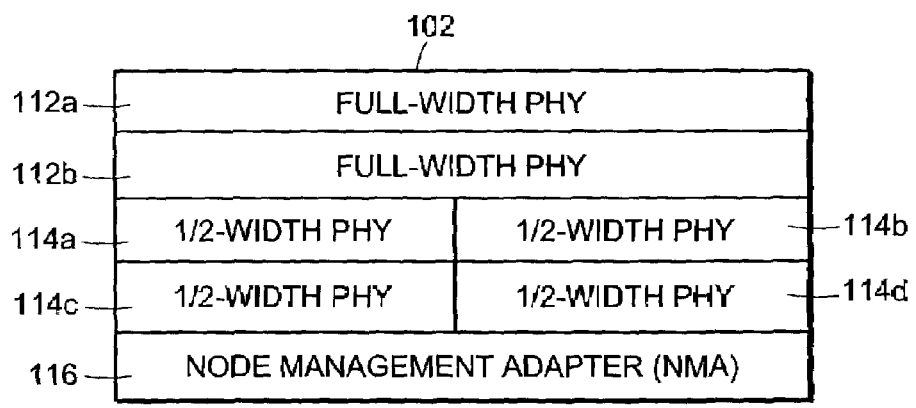
FIG. 2B is an illustrative diagram of a rear view of the 4U stack chassis shown in FIG. 2A.

FIG. 2B shows a rear view of an embodiment of the 4U stack chassis 102 including a plurality of physical port adapter (PHY) cards 112, 114 and a node management adapter card 116. Each of the PHY cards 112, 114 and the node management adapter card 116 physically reside in slots within the stack chassis 102. Embodiments of PHY cards include full-width PHY cards and half-width PHY cards. In this embodiment, the stack chassis 102 includes full-width PHY cards 112*a*, 112*b* (generally full-width PHY card 112), and half-width PHY cards 114*a*, 114*b*, 114*c*, 114*d* (generally half-width PHY card 114). The full-width PHY card 112 is physically and functionally a single card that resides in one slot in the 4U or 2U stack chassis 102, 107 (or in the 4U fabric chassis 104 discussed below). The half-width PHY card 114 is physically half the size of a full-width PHY card 112 that resides in one-half slot in the 4U or 2U stack chassis 102, 107 (or in the 4U fabric chassis 104 discussed below). However, each half-width PHY card 114 functions independently. The PHY cards 112, 114 include ports that transmit/receive packets to/from the local switch 142 or the POP switch 132, for example. The PHY cards 112, 114 also communicate with the service cards 106.

The node management adapter card 116 provides access to generic control interfaces for node management and diagnostics. The node management adapter card 116 includes Ethernet, DB9, and RS232 connectors for connecting to external management devices such as a user's network and alarm lights. The node management adapter card 116 also provides connectivity for T1/E1 timing inputs via wire-wrap terminals or a RJ connector.

Figure 2C:
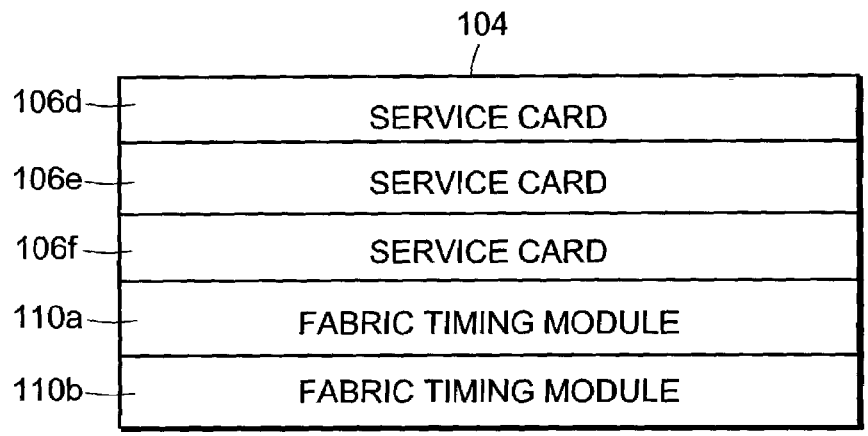
FIG. 2C is an illustrative diagram of a front view of a 4U fabric chassis, according to one embodiment of the invention.

FIG. 2C shows a front view of an embodiment of the 4U fabric chassis 104 including service cards 106*d*, 106*e*, 106*f*, and fabric timing modules 110*a*, 110*b* (generally fabric timing module 110). The fabric timing modules 110 provide timing signals to all the components in the fabric chassis 104, interface with the stack timing modules 108 in the stack chassis 102, and transfer packets between the fabric chassis 104 and the stack chassis 102. The service cards 106 function the same way as in the 4U stack chassis 102.

Figure 2D:
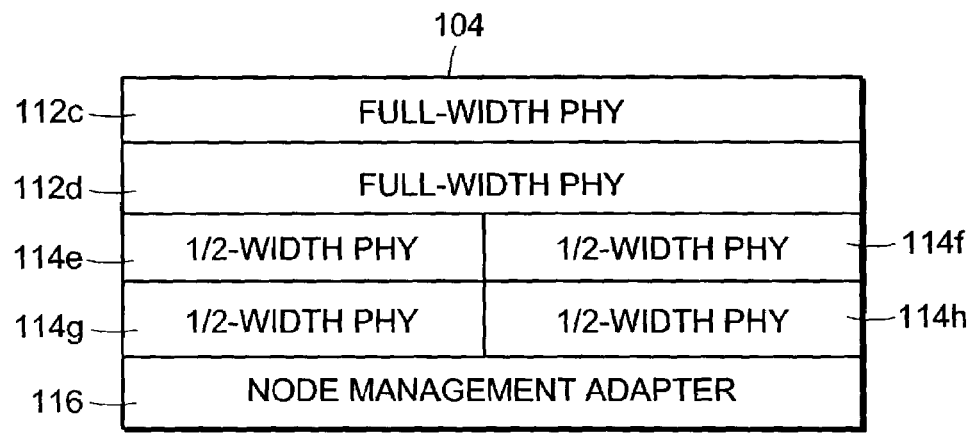
FIG. 2D is an illustrative diagram of a rear view of the 4U fabric chassis shown in FIG. 2C.

FIG. 2D shows a rear view of an embodiment of the 4U fabric chassis 104 including a plurality of physical port adapter cards 112, 114 and a node management adapter card 116. As previously described, embodiments of PHY cards include full-width PHY cards and half-width PHY cards. The fabric chassis 104 includes full-width PHY cards 112*c*, 112*d*, and half-width PHY cards 114*e*, 114*f*, 114*g*, 114*h*. The PHY cards 112, 114 function the same way as in the 4U stack chassis 102.

Figure 3A:
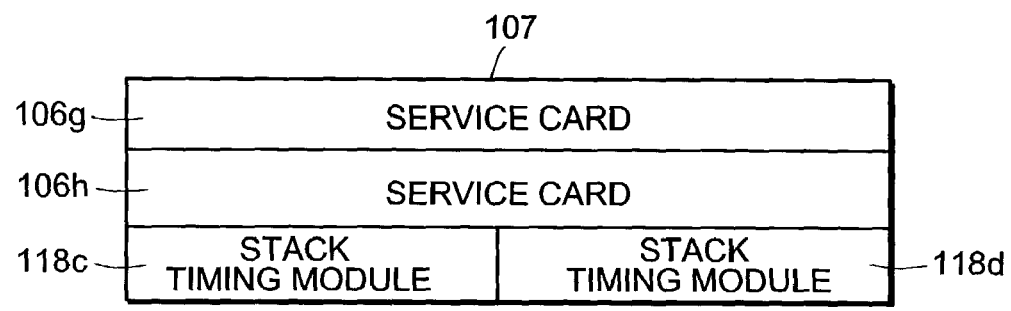
FIG. 3A is an illustrative diagram of a front view of a 2U (3.4 inches high) chassis, according to one embodiment of the invention.

FIGS. 3A shows an embodiment of a front view of the 2U stack chassis 107 including service cards 106g, 106h and stack timing modules 118c, 118d. The service cards 106 and the stack timing modules 118 function the same way as in the 4U stack chassis 102.

Figure 3B:
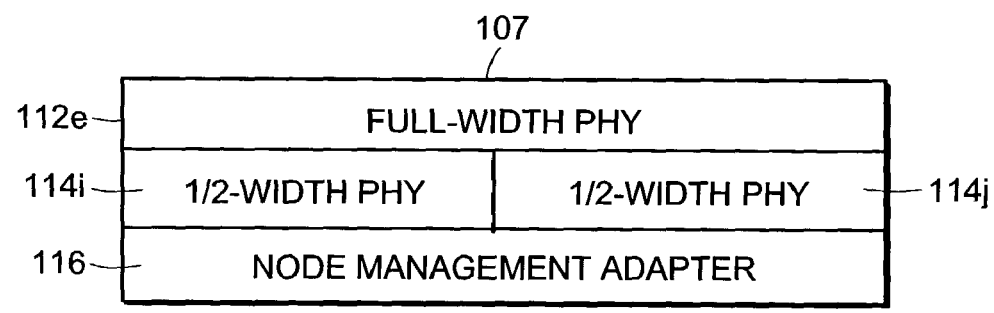
FIG. 3B is an illustrative diagram of a rear view of the 2U chassis shown in FIG. 3A.

FIG. 3B shows an embodiment of a rear view of the 2U stack chassis 107 including a plurality of PHY cards 112, 114 and a node management adapter card 116. The stack chassis 107 includes one full-width PHY card 112, and two half-width PHY cards 114i, 114j. The PHY cards 112, 114 and the node management adapter 116 function the same way as in the 4U stack chassis 102.

Figure 4:
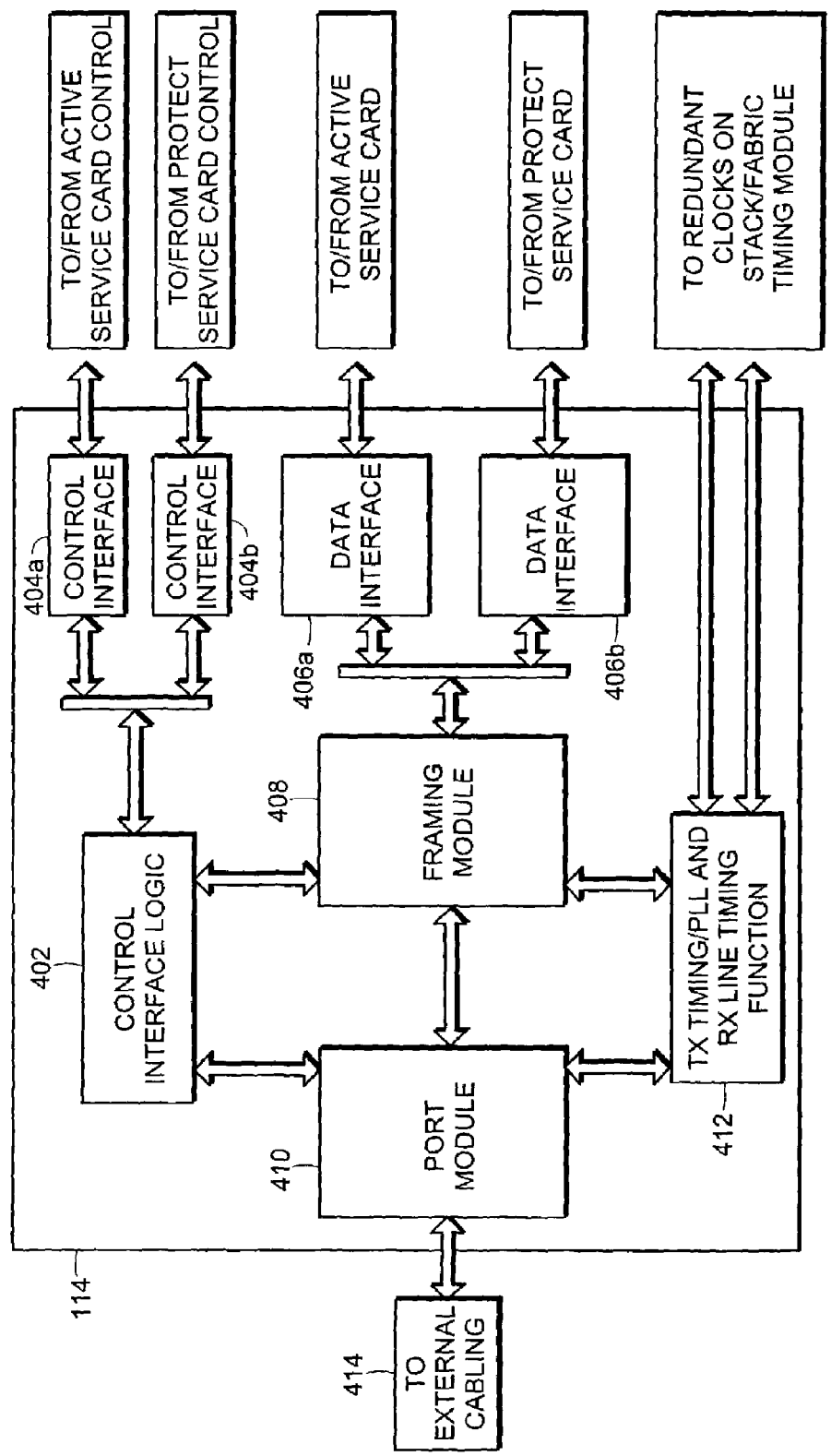
FIG. 4 is an illustrative block diagram of a physical layer adapter (PHY) card, according to one embodiment of the invention.

FIG. 4 shows an embodiment of the physical port adapter (PHY) card 114. The PHY card 114 includes control interface logic 402, control interfaces 404a, 404b, data interfaces 406a, 406b, timing logic 412, a port module 410, and a framing module 408.

The control interface logic 402 is in communication with and controls the port module 410 and the framing module 408. The control interface logic 402 is also in communication with the two control interfaces 404a, 404b which are in communication with one of the service cards 106 (shown in FIG. 5). The two data interfaces 406a, 406b are also each in communication with a separate service card 106 and transfer packets between the PHY card 114 and the service cards 106. The port module 410 connects to the network 150 (through external cabling 414) and may include multiple port types and port densities. In one embodiment, the port types that are supported include, but are not limited to, T1/E1, DS3, T3/E3, optical carrier-3 (OC3), OC12, and OC48, for example. The framing module 408 converts packets received by the port module 410 from the network into a data stream. The data interfaces 406a, 406b then transmit the data stream to the service card 106 via a packet bus. The framing module 408 also converts a data stream received from the service card 106 (via a packet bus) into packets and transmits them to the port module 410. The port module 410 then transmits the packets to the network 150. The timing logic 412 receives timing signals from the stack timing module 108 (shown in FIG. 6) or the fabric timing module 110 (shown in FIG. 7) and provides timing for the PHY card 114.

Figure 5:
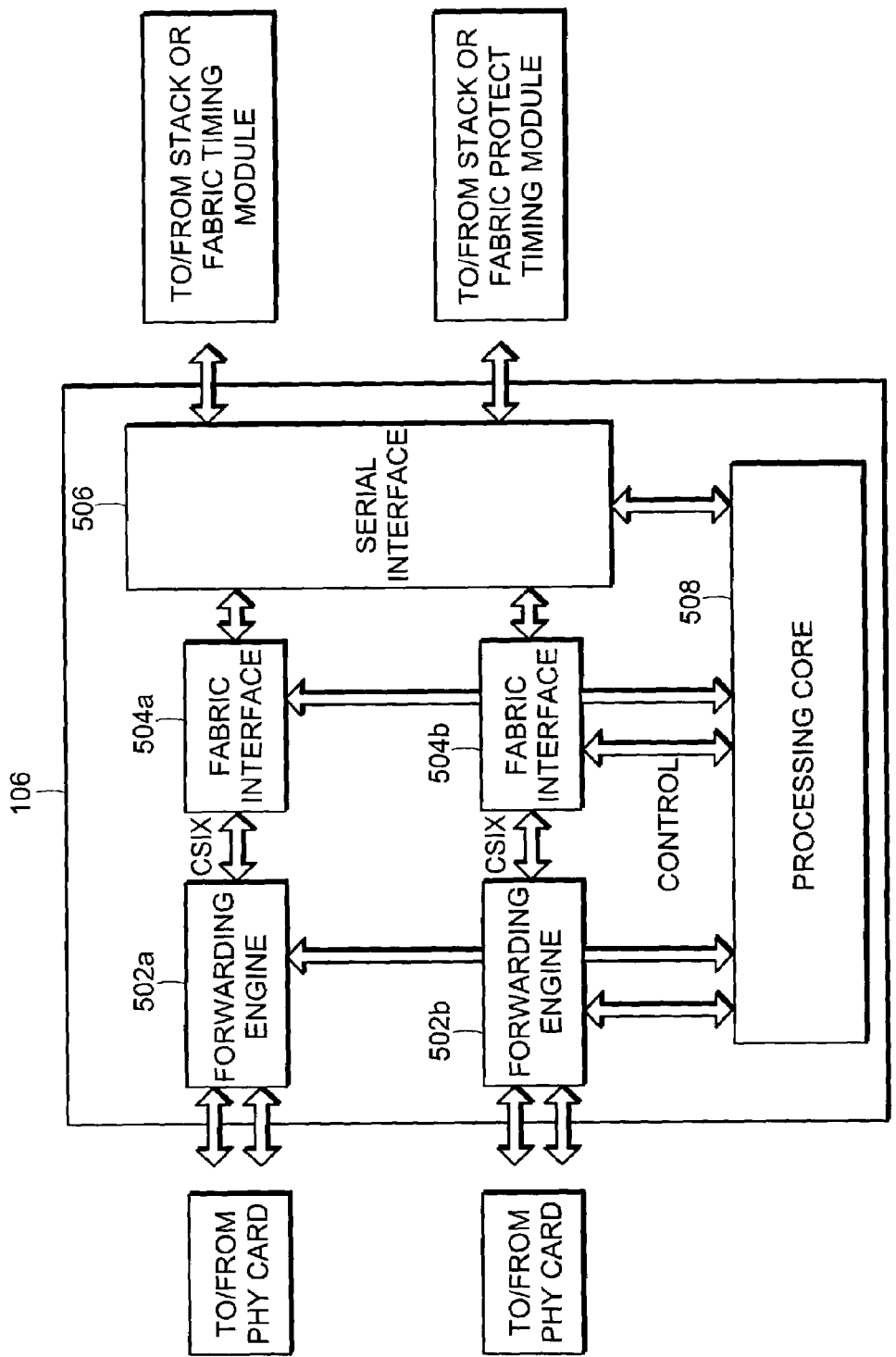
FIG. 5 is an illustrative block diagram of a service card, according to one embodiment of the invention.

FIG. 5 shows an embodiment of the service card 106 (also referred to as a forwarding module). The service card 106 processes packets that are transmitted/received by the PHY card 114 to/from the network 150. The service card 106 includes one or more forwarding engines 502a, 502b, one or more switch fabric interfaces 504a, 504b, a serial interface 506, and a processing core 508.

Service cards 106 may, for example, conform to a specific protocol, such as ATM, TDM, frame relay, or IP/MPLS, or support multiple protocols. The service cards 106 in the tandem switch 100 are chosen based on the protocol(s) used by the network 150 that the tandem, switch 100 is in communication with. For example, if the tandem switch 100 is in communication with an ATM protocol based network, the service card 106 will be dedicated to the ATM protocol.

The forwarding engines 502a, 502b transmit/receive packets to/from the PHY card 114 (shown in FIG. 4). Each forwarding engine 502a, 502b includes two separate interfaces to two separate PHY cards 114 and is described in further detail below. The processing core 508 is in communication with the forwarding engines 502a, 502b, the switch fabric interfaces 504a, 504b, and the serial interface 506. The forwarding engines 502a, 502b and the switch fabric interfaces 504a, 504b use a standard bus format, such as the Common Switch Interface (CSIX) bus format or the System Packet Interface Level 3 (SPI-3) bus format, to communicate with each other. The processing core 508 processes control information received from the forwarding engines 502a, 502b or the serial interface 506, and manages general card operation. The serial interface 506 transmits/receives packets to/from the stack timing module 108 (shown in FIG. 6) or the fabric timing module 110 (shown in FIG. 7) via a distributed optical backplane 138 (shown in FIG. 1B).

Service cards 106 provides processing related to Frame Relay, ATM, IP/MPLS protocols. The service cards 106 also perform statistics processing of events from port modules 410 on PHY cards 112, 114 that are in communication with a particular service card 106.

Figure 6:
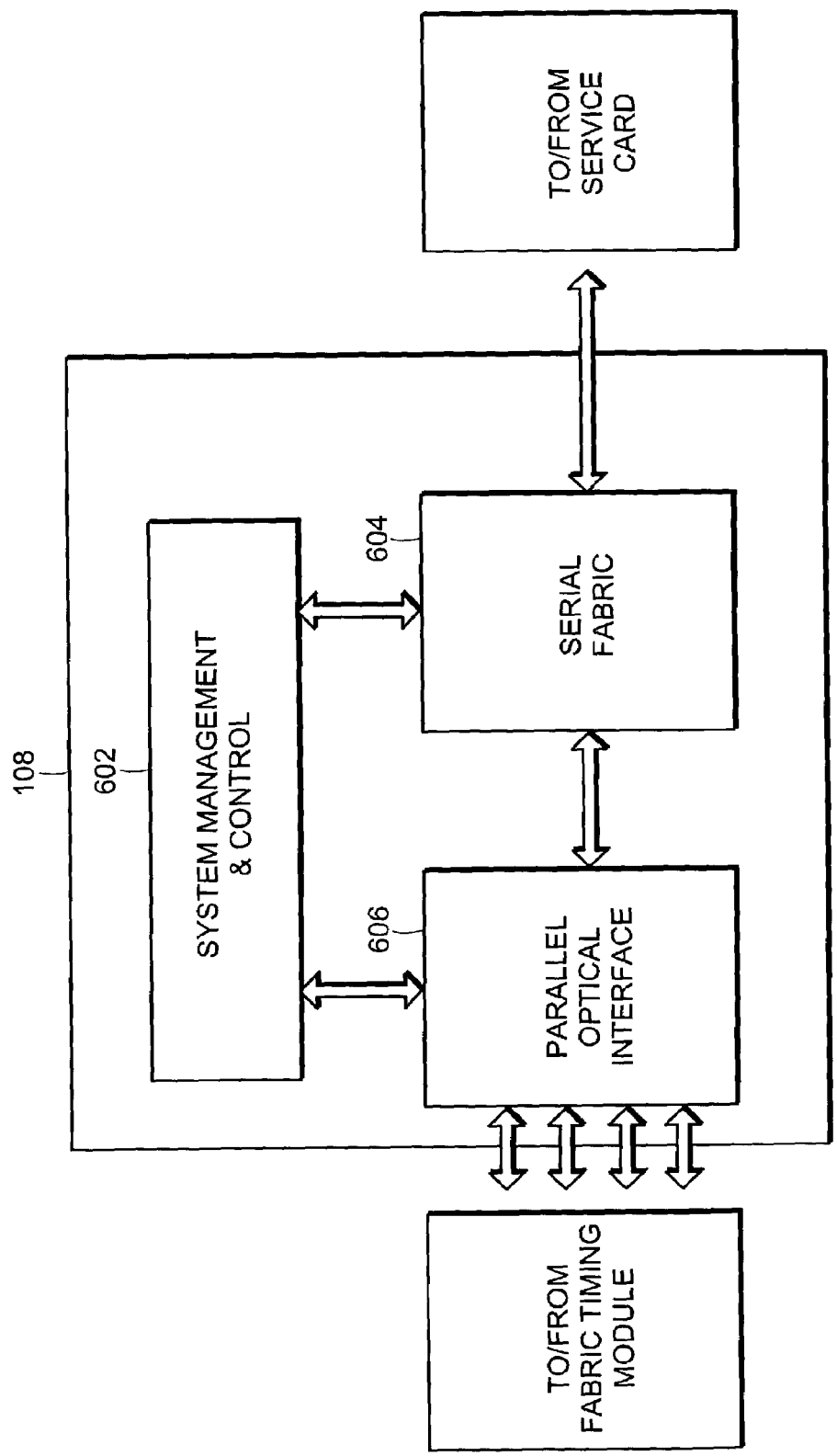
FIG. 6 is an illustrative block diagram of a stack timing module, according to one embodiment of the invention.

FIG. 6 shows an embodiment of the stack timing module 108. The stack timing module 108 generates and transmits timing signals to the PHY cards 114 (FIG. 4) and the service cards 106 (FIG. 5) that are in the same stack chassis 102. Each stack timing module 108 synchronizes to the fabric timing module 110 (timing master) in the fabric chassis 104. The stack timing module 108 also transmits/receives packets to/from the fabric timing module 110 (shown in FIG. 7) and from service cards within its own shelf 106 (FIG. 5). The stack timing module 108 includes a system management and control module 602, a parallel optical interface 606, and a serial fabric 604. The system management and control module 602 is in communication with the parallel optical interface 606 and the serial fabric 604. The parallel optical interface 606 transmits/receives packets to/from the fabric timing module 110 (FIG. 7) via the distributed optical backplane 138 (FIG. 1B). The parallel optical interface 606 also transmits/receives packets to/from the serial fabric 604.

The serial fabric 604 transmits/receives packets to/from the service card 106. The system management and control module 602 provides an auxiliary processing capability for the stack timing module 108 including centralized control of management functions related to the shelf and node. Generally, the shelf and node control functions are logically assigned to a service card 106. If the switch 100 is a single shelf configuration, then the service card 106 acting as the shelf controller also performs the node control function. If the switch 100 is in stacked shelf configuration, each shelf has a shelf controller (service card 106) but there is only one node controller, which is assigned to the self that includes the fabric timing module 110. The system management and control module 602 allows the fabric timing card 110 to become the shelf controller and/or the node controller of the system thereby freeing the service cards 106 of these tasks. As the switch 100 grows and centralized processing functions become more burdensome, the system management and control module 602 optionally provides dedicated processing for centralized protocol/routing functions.

Figure 7:
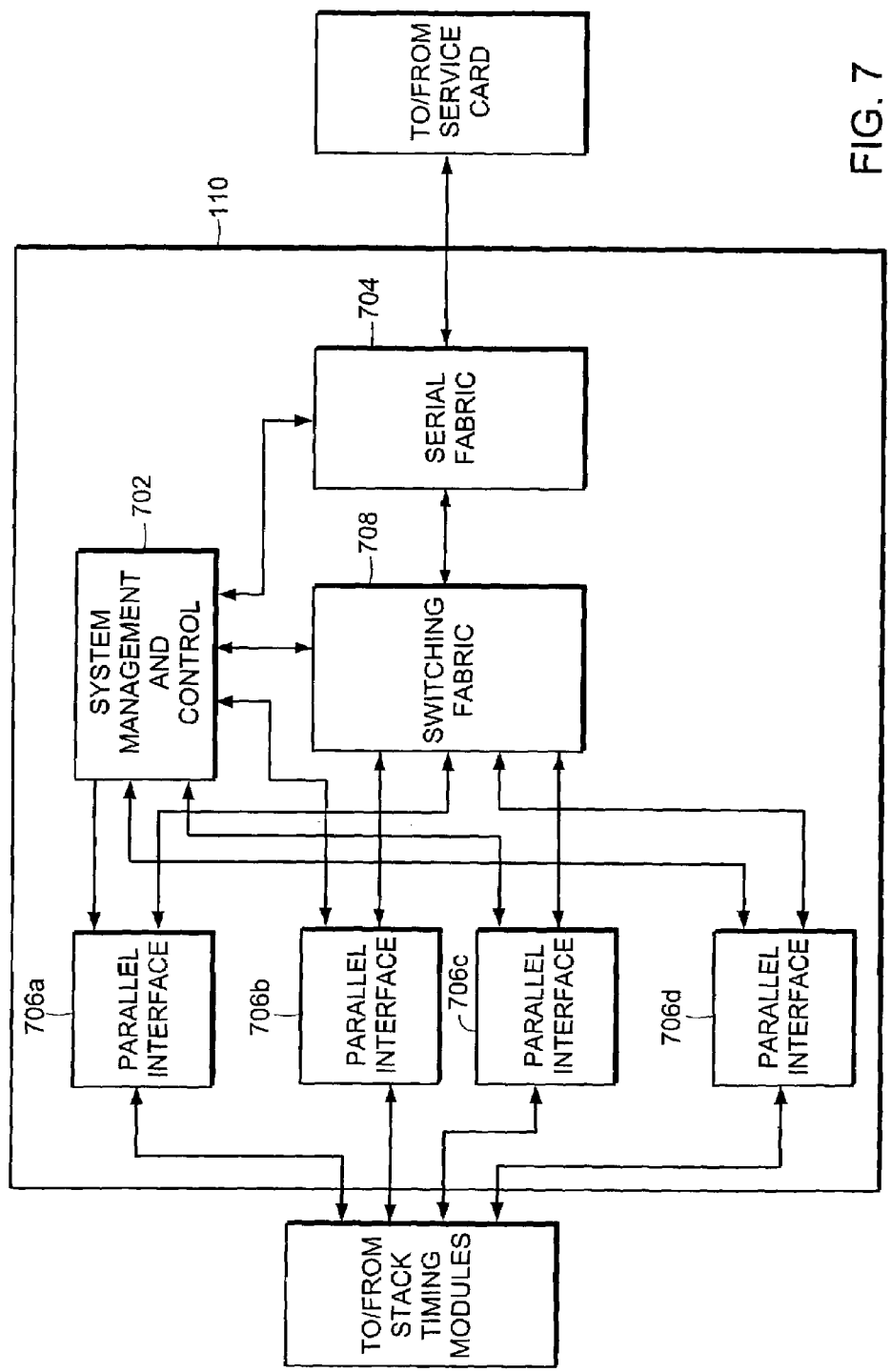
FIG. 7 is an illustrative block diagram of a fabric timing module, according to one embodiment of the invention.

FIG. 7 shows an embodiment of the fabric timing module 110. The fabric timing module 110 resides in the fabric chassis 104 (shown in FIG. 2C) and interfaces with one or more stack timing modules 108 (shown in FIG. 6), residing in separate stack chassis 102, 107. The fabric timing module 110 is the system (rack) timing master and synchronizes each stack timing module 108 (one per stack chassis 102). The fabric timing module 110 includes a system management and control module 702, four parallel optical interfaces 706a, 706b, 706c, 706d, a switching fabric 708, and a serial fabric 704.

The system management and control module 702 is in communication with the parallel interfaces 706a, 706b, 706c, 706d, the serial fabric 704, and the switching fabric 708. The system management and control module 702 provides an auxiliary processing capability for the fabric timing module 110 similar to the system management and control module 602 on the stack timing module 108 as previously described. The parallel interfaces 706a, 706b, 706c, 706d are in communication with the distributed optical backplane 138 (FIG. 1B) and the switching fabric 708. Each parallel interface 706a, 706b, 706c, 706d transmits/receives packets to/from the stack timing module 108 (shown in FIG. 6) residing in separate stack chassis 102, 107 (via the distributed optical backplane 138). The parallel interfaces 706a, 706b, 706c, 706d also transmit/receive packets to/from the switching fabric 708. The switching fabric 708 multiplexes packet transfers between the parallel interface 706a, 706b, 706c, 706d and the serial fabric 704. In one embodiment, the switching fabric 708 is, for example, WaveSmith CSF™ (Centralized Switch Fabric) or DSF™ (Distributed Switch Fabric) by WaveSmith Networks Inc. of Acton, Mass. In another embodiment, the switching fabric 708 is, for example, any of commercially available Vitesse Gigastream™ fabric devices by Vitesse Corporation of Camarillo, Calif. and Agere PI40™ family fabric devices of Agere Systems, Inc. of Allentown, Pa. The serial fabric 704 transmits/receives packets to/from the service card 106 (shown in FIG. 5).

System Redundancy

Figure 8A:
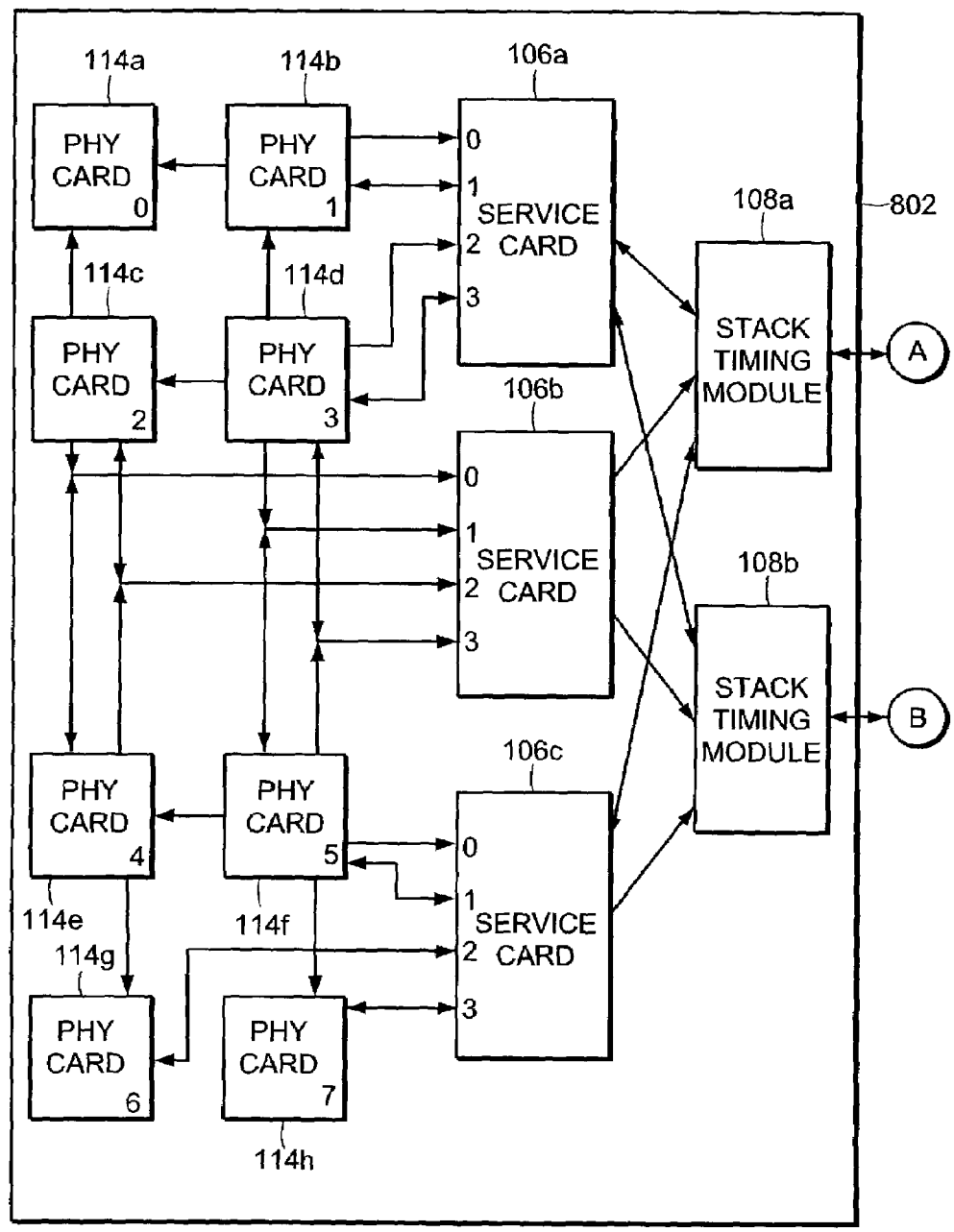
FIG. 8A is an illustrative block diagram of a 4U stack chassis, according to one embodiment of the invention.

FIGS. 8A shows an embodiment of a 4U stack chassis 802 including the service cards (forwarding modules) 106a, 106b, 106c, and stack timing modules 108a, 108b. The stack chassis 802 also includes eight half-width PHY cards 114a, 114b, 114c, 114d, 114e, 114f, 114g, 114h. In other embodiments, the stack chassis 802 may include 4 full-width PHY cards 112 or a combination of full and half-width PHY cards 112, 114.

The four PHY cards 114a, 114b, 114c, 114d are each in communication (over a link) with the network 150 (FIG. 1) and with the service card 106a and the service card 106b. Further, the four PHY cards 114e, 114f, 114g, 114h are each in communication with the network 150 and with the service card 106b and the service card 106c. The service cards 106a, 106b, 106c are each also in communication (over a link) with the stack timing cards 108a, 108b. A link includes an electrical or optical connection.

The PHY cards 114a-114h optionally function in pairs, and employ Automatic Protection Switching (APS). With APS, a pair of PHY cards, such as PHY cards 114a-114b for example, connect to the network 150 and have access to the same packets (transmitted and/or received). The PHY cards 114a and 114b are also in communication with the service card 106a through separate, redundant links. The PHY card 114a is the active card and the PHY card 114b is the backup for the PHY card 114a. If the PHY card 114a, the link to the network 150, and/or the link to the service card 106a fails, the service card 106a (chassis controller) instructs the PHY card 114b to become active and reroutes the packets to the PHY card 114b. These redundant links allow packets received (from the network 150) by the PHY card 114a or the PHY card 114b (if the PHY card 114a fails) to be transmitted to the service card 106a. Likewise, the redundant links allow the service card 106a to transmit packets to the PHY card 114a or the PHY card 114b (if the PHY card 114a fails). The other redundant PHY card 114 pairings (active and protection) include the PHY cards 114c (active) and 114d (protection), the PHY cards 114e (active) and 114f (protection), and the PHY cards 114g (active) and 114h (protection).

The service cards 106a, 106b, 106c have a redundant (active/protection) architecture. The service cards 106a, 106c are active cards and the service card 106b is a protection card. The service cards 106a, 106b are in communication with the PHY cards 114a-114d. The service card 106b becomes active (transmits and receives packets) if the service card 106a fails.

Further, the service cards 106b, 106c are in communication with the PHY cards 114e-114h. The service card 106b becomes active if the service card 106c fails. The service card 106b (protection) may take over for only one of the service cards 106a, 106c at a time.

Before the protect service card 106b takes over for a failed service card 106a or 106c (called switchover), the service card 106a or 106c being replaced tries to complete all control transactions to any connected PHY cards 114. The protect service card 106b is then initialized prior to taking over for the failed service card 106a or 106c. After the initialization of the service card 106b is complete, the service card 106b restores packet flow.

As previously described, the service card 106a also acts as a chassis controller. The chassis controller resides in slot one of the stack chassis 802, and controls all the other components in the stack chassis 802. If the chassis controller (service card 106a) fails, then a backup chassis controller (service card 106b), which resides in slot two, takes over as the chassis controller. In the event both service card 106a (chassis controller) and service card 106c fail, the service card 106b becomes active. The service card 106b acts as a backup for the service card 106a and becomes the new chassis controller, and ignores service card 106c. If the service card 106a fails at a time when the service card 106b is already substituting for a failed service card 106c, the service card 106b changes from backing up the service card 106c to backing up service card 106a. The service card 106b also takes over as the chassis controller.

The service cards 106 generate an "online" signal and several control signals and send the signals to each of the connected PHY cards 114. The PHY cards 114 use the online and control signals to determine which service card 106 is currently active, and therefore which service card 106 to transmit/receive packets to/from. For example, both the service cards 106a, 106b generate online and control signals and send the signals to the PHY cards 114a-114d. If the service card 106a fails, the online and control signals from the service card 106a instruct the PHY cards 114a-114d that the service card 106a has failed. The online and control signals from the service card 106b then instruct the PHY cards 114a-114d to transmit/receive packets from the service card 106b.

The stack timing modules 108a and 108b conform to the redundant (active/protection) architecture of the present invention. The stack timing modules 108a, 108b are in communication with the service cards 106a, 106b, 106c. The stack timing module 108a is the active module and the stack timing module 108b is the protection module (or vice versa). The stack timing modules 108a and 108b each produces a "TM online" signal which the PHY cards 114 use to determine which stack timing module 108 is active and providing the correct timing.

Figure 8B:
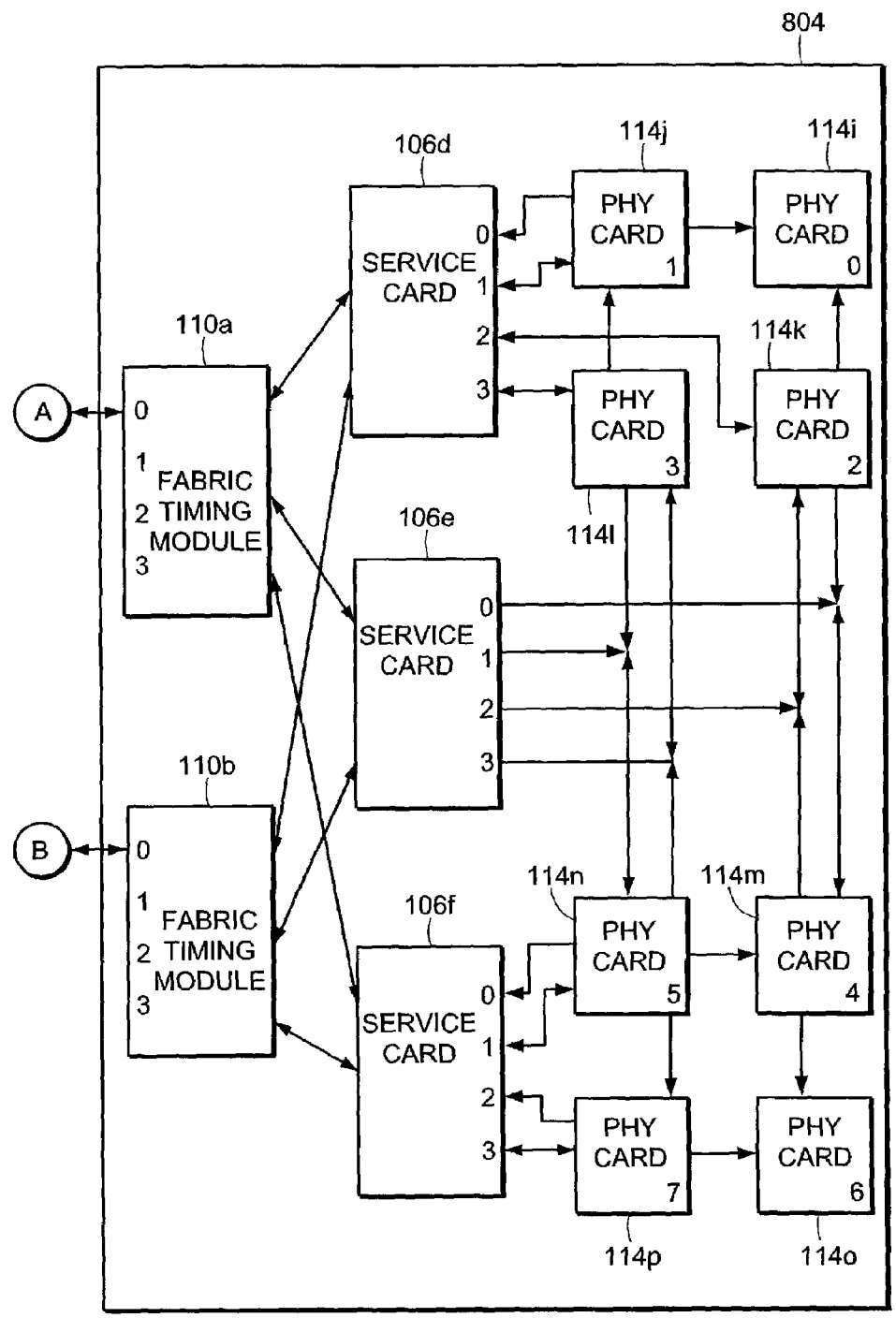
FIG. 8B is an illustrative block diagram of a 4U fabric chassis, according to one embodiment of the invention.

FIG. 8B, shows an embodiment of a 4U fabric chassis 804 including service cards 106d, 106e, 106f and fabric timing modules 110a, 110b. The fabric chassis 804 also includes eight half-width PHY cards 114i, 114j, 114k, 114l, 114m, 114n, 114o, 114p. The PHY cards 114 and the service cards 106 function in the same way as in the 4U stack chassis 802. The fabric timing modules 110a, 110b are both active cards and are in communication with the service cards 106d, 106e, 106f.

The benefit of the redundant component architecture is that, unlike typical tandem switches, if one or more of a physical layer adapter cards 112, 114, service cards 106, or a timing module 108, 110 fails, the tandem switch 100 will still continue to function and packets will not be lost during transmission.

Figure 9:
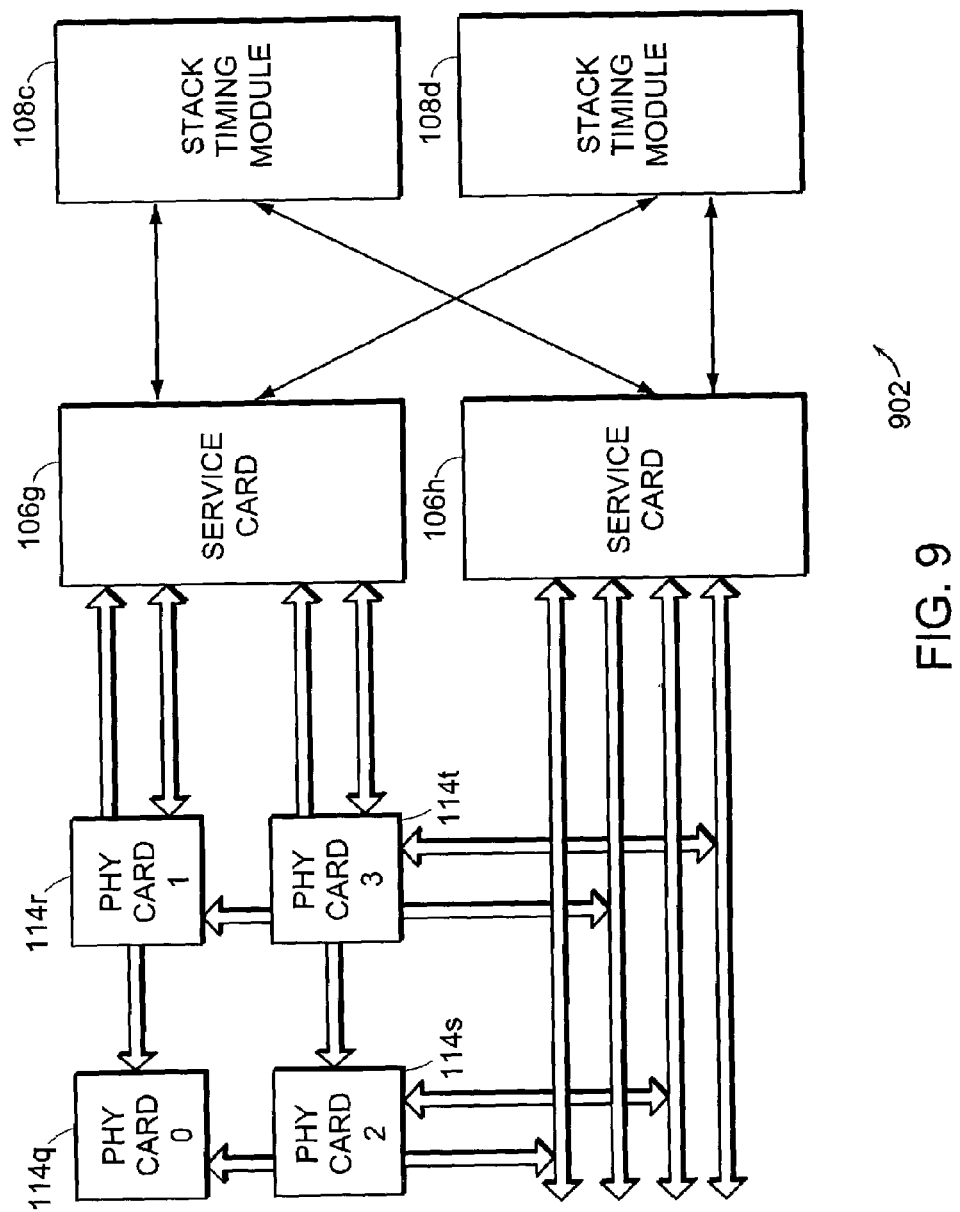
FIG. 9 is an illustrative block diagram of a 2U interconnection between a plurality of PHY cards and service cards, according to one embodiment of the invention.

FIG. 9 shows an embodiment of a 2U stack chassis 902 which may also interface with the fabric chassis 804 (shown in FIG. 8B) instead of, or in addition to, the 4U stack chassis 802 (shown in FIG. 8A). The 2U stack chassis 902 includes service cards 106g, 106h and stack timing modules 108c, 108d. The 2U stack chassis 902 also includes four half-width PHY cards 114q, 114r, 114s, 114t. In other embodiments, the stack chassis 902 may include 2 full-width PHY cards 112 or a combination of full and half-width PHY cards 112, 114. The 2U stack chassis 902 functions the same way as the 4U stack chassis 802 shown in FIG. 8A.

Figure 10:
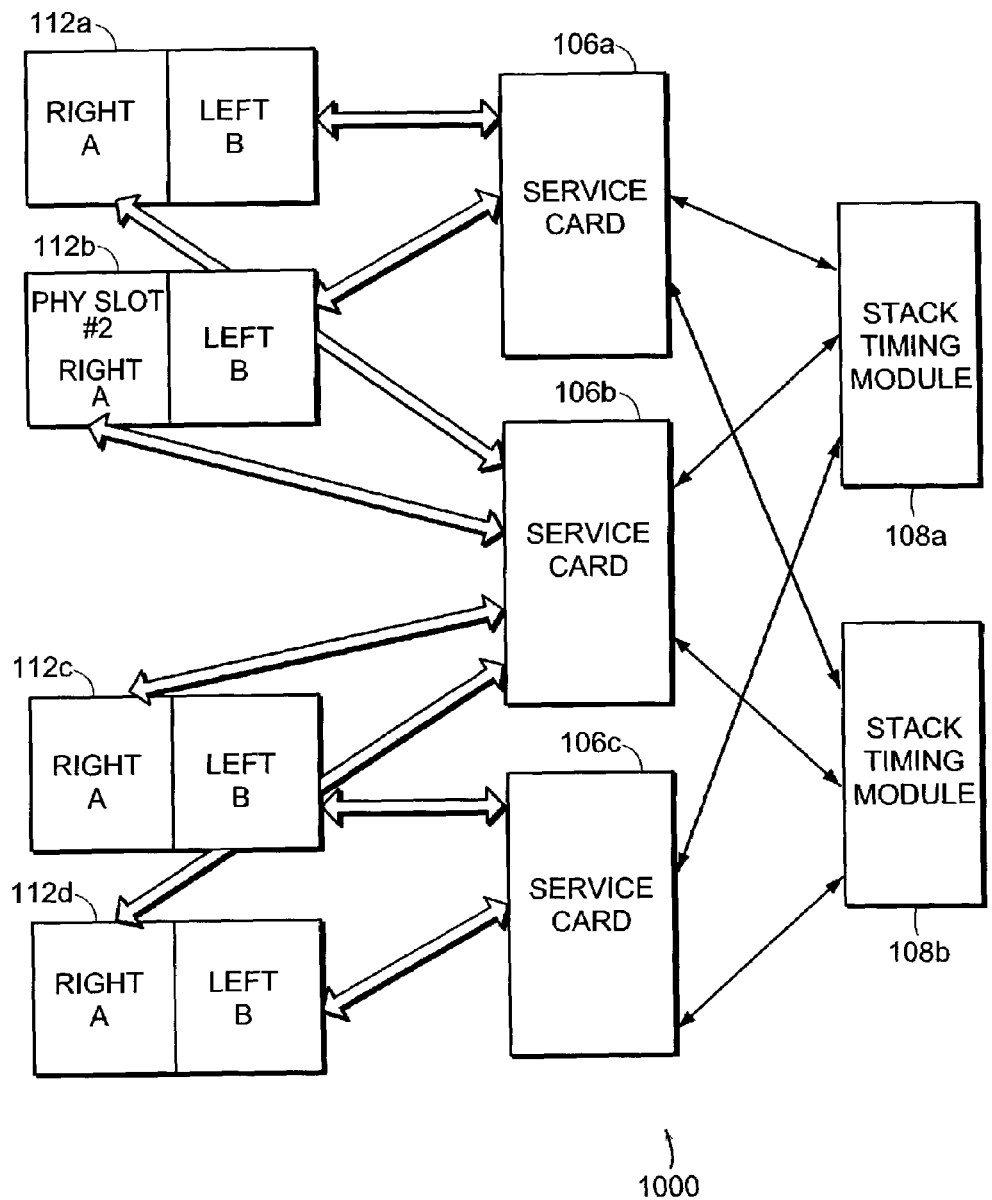
FIG. 10 is an illustrative block diagram of physical layer adapter cards and service cards configured for high speed operation, according to one embodiment of the invention.

FIG. 10 shows another embodiment of a 4U stack chassis 1000 including service cards 106a, 106b, 106c and stack timing modules 108a, 108b. The 4U stack chassis 1000 also includes four full-width PHY cards 112a, 112b, 112c, 112d. The two PHY cards 112a, 112b are each in communication with the network 150 and with the service cards 106a, 106b over a high speed bus (4×1.25 GHz) rather than a typical bus (800 MHz) (shown in FIG. 8A). Further, the two PHY cards 112c, 112d are each in communication with the network 150 and with the service cards 106b, 106c. The service cards 106a, 106b, 106c are each also in communication with the stack timing cards 108a, 108b. This configuration utilizes full-width PHY cards that have a high port density such as OC48, for example.

Figure 11:
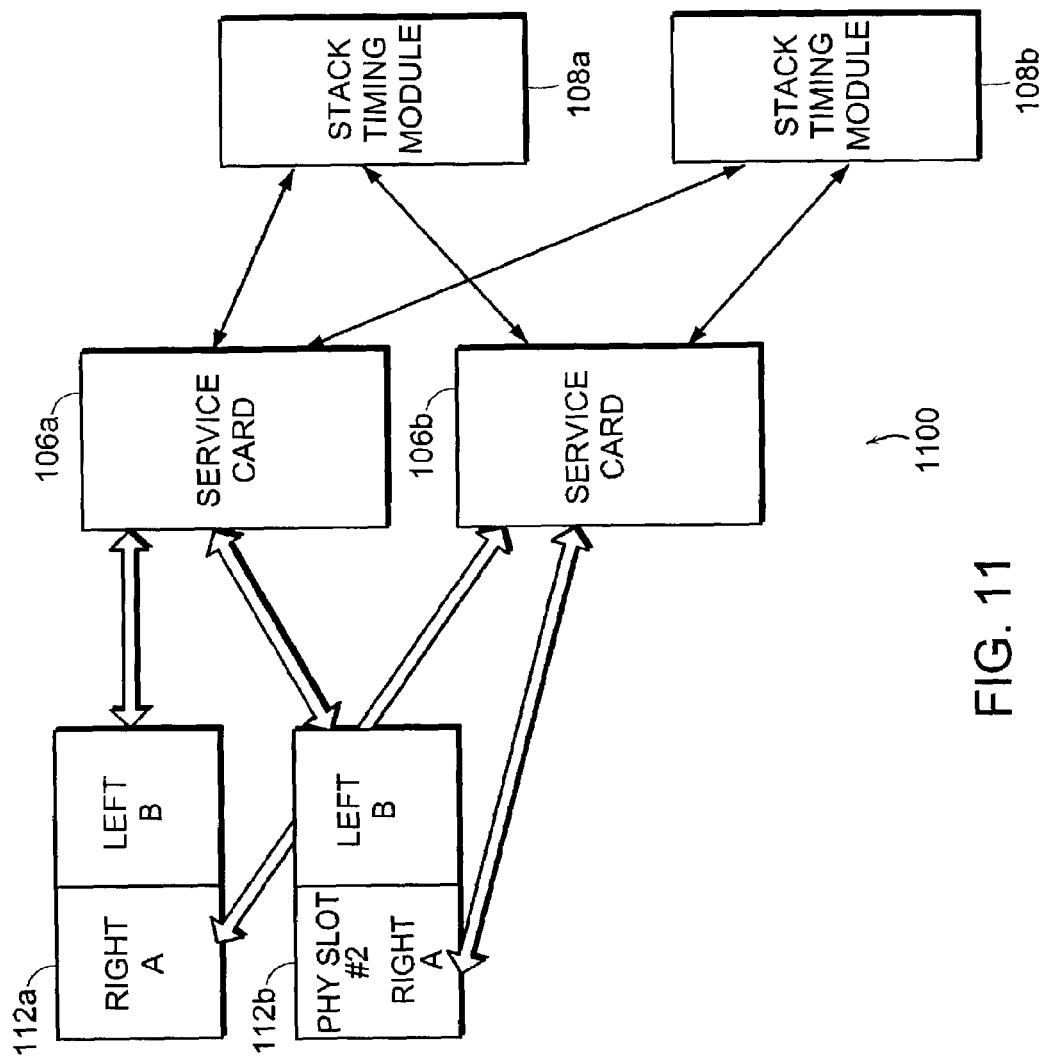
FIG. 11 is an illustrative block diagram of physical layer adapter cards and service cards configured for high speed operation, according to another embodiment of the invention.

FIG. 11 shows another embodiment of a 2U stack chassis 1100 employing the high speed bus architecture. This embodiment includes the service cards 106a, 106b and the stack timing modules 108a, 108b. The 2U stack chassis 1100 also includes the two full-width PHY cards 112a, 112b. The 2U stack chassis 1100 functions the same way as the 4U stack chassis 1000.

Load Balancing

In one embodiment, the telecommunication switch architecture of the present invention load balances packet transfers that occur between a stack chassis 802 and a fabric chassis 804. A load balancing architecture is an architecture which enables packet transfers to be distributed over active links. In this approach, links in both a first link group and a second link group are active, allowing for packet transfers over any active link. Thus, a link failure only affects traffic on the failed link, and not in the link group. Traffic will automatically route away from the failed link to any remaining active link.

Figure 12:
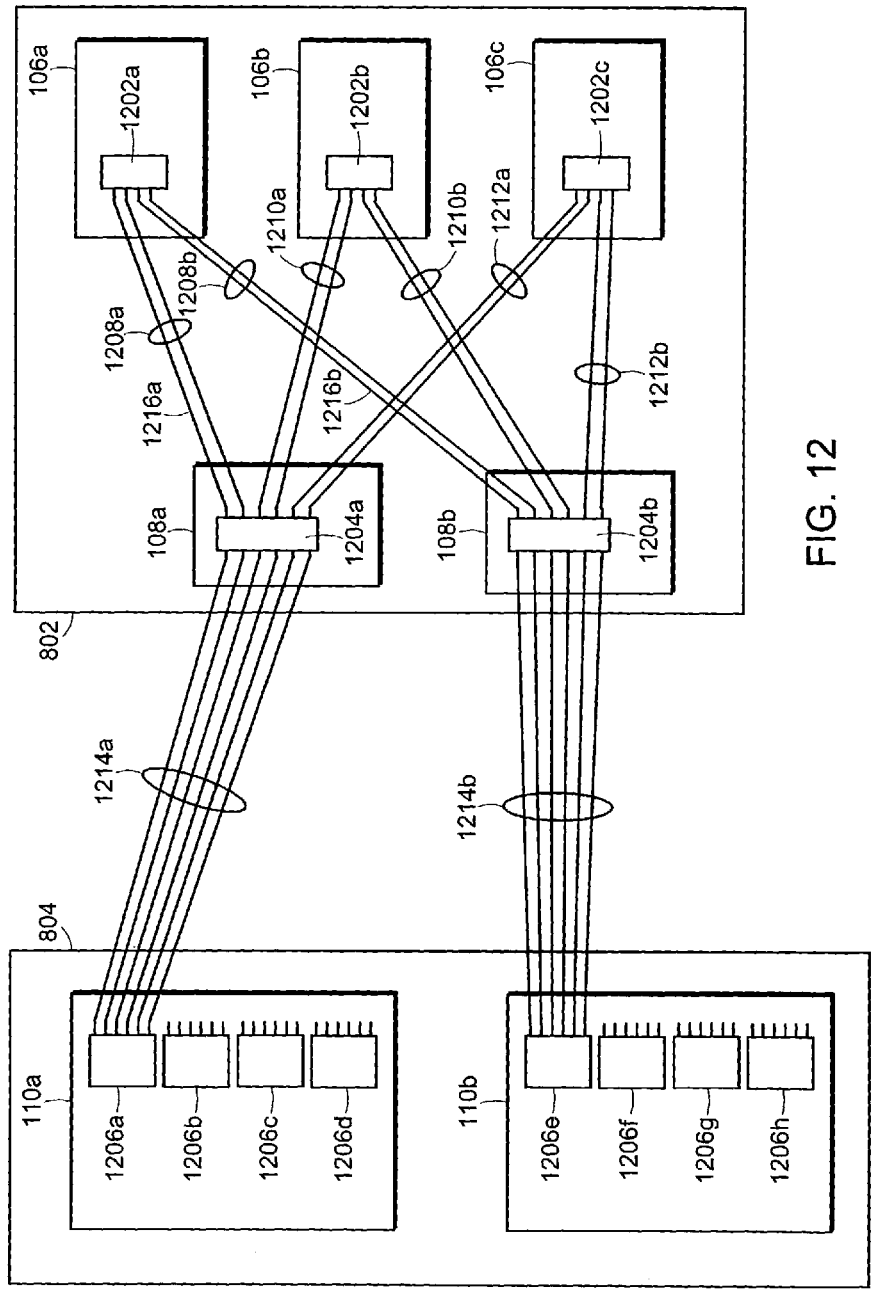
FIG. 12 is an illustrative block diagram of a load-balancing architecture, according to one embodiment of the invention.

FIG. 12 shows an embodiment of the stack chassis 802 including three service cards 106a, 106b, 106c, and two stack timing modules 108a, 108b. Each of the three service cards 106a, 106b, 106c includes a high speed serial interface 1202a, 1202b, 1202c, and each of the stack timing modules 108a, 108b includes a parallel interface 1204a, 1204b. The service card 106a, which serves as a stack controller in addition to a packet processor, is in communication with the stack timing modules 108a, 108b via link groups 1208a, 1208b. The link groups 1208a, 1208b are redundant such that the link groups 1208a, 1208b provide two separate pathways for a plurality of packets to travel to and from the service card 106a. Likewise, the service cards 106b, 106c are in communication with the stack timing modules 108a, 108b via link groups 1210a, 1210b and link groups 1212a, 1212b, respectively. Moreover, the link groups 1210a, 1210b are redundant and the link groups 1212a, 1212b are redundant. The interconnections between the service cards 106a, 106b, 106c and the stack timing modules 108a, 108b are referred to as a mesh. This mesh is located inside the stack chassis 802.

The fabric chassis 804 includes two fabric timing modules 110a, 110b. The fabric timing module 110a includes four fabric interfaces 1206a, 1206b, 1206c, 1206d, and the fabric timing module 110b also includes four fabric interfaces 1206e, 1206f, 1206g, 1206h.

The stack chassis 802 is in communication with the fabric chassis 804 via a link groups 1214a connecting the parallel interface 1204a (on the stack timing module 108a) to the fabric interface 1206a (on the fabric timing module 110a). Further, the stack chassis 802 is in communication with the fabric chassis 804 via the link group 1214a connecting the parallel interface 1204b (on the stack timing module 108b) to the fabric interface 1206a (on the fabric timing module 110b). The link groups 1214a, 1214b are redundant such that the link groups 1214a, 1214b provide two separate pathways for a plurality of packets to travel between the stack chassis 802 and the fabric chassis 804. The link groups 1208a, 1208b, 1210a, 1210b, 1212a, 1212b, 1214a, 1214b may be electrical or optical links.

In operation, the service card 106a processes a first plurality of packets and transmits the first plurality of packets to both of the stack timing modules 108a, 108b over the link group 1208a and the link group 1208b, respectively. Likewise, the service card 106c processes a second plurality of packets and transmits the second plurality of packets to both of the stack timing modules 108a, 108b over the link group 1212a and the link group 1212b, respectively.

The service card 106b is a protection service card and becomes active only if the service card 106a or the service card 106c fails. If one of the active service cards 106a, 106c fails, the service card 106b processes the plurality of packets (first or second) from the failed service card and transmits the plurality of packets to both of the stack timing modules 108a, 108b over the link group 1210a and the link group 1210b, respectively.

The stack timing modules 108a, 108b may transmit the first and second pluralities of packets to the fabric chassis 804 via the link group 1214a and the link group 1214b, respectively. Both the link group 1214a and the link group 1214b are considered active for load balance operation.

The service card 106a (the chassis controller) monitors packet flow to and from both stack timing modules 108a, 108b. If any individual link in any of the link groups 1208a, 1210a, 1212a, 1214a fails, the service card 106a redistributes the packet flow from the failed link to a corresponding active link in that group, or to one of the link groups 1208b, 1210b, 1212b, 1214b. For example, if a link 1216a (in the link group 1208a) fails, the packets that would have been transmitted or received over the link 1216a are rerouted by the service card 106a to any remaining active link in the link group 1208a, or to any active link in the link group 1208b.

An advantage of this configuration, is that the mesh of links 1208a, 1208b, 1210a, 1210b, 1212a, 1212b between the service cards 106a, 106b, 106c and the stack timing modules 108a, 108b enables a link redundancy that is internal to the stack chassis 802 rather than external to the stack chassis 802. This internal link redundancy minimizes the number of external connections required between the stack chassis 802 and the fabric chassis 804 and thereby allows multiple stack chassis 802 to be stacked in a rack system (similar to the rack system shown in FIG. 1) and communicate with the fabric chassis 804.

Chassis Stacking

Figure 13:
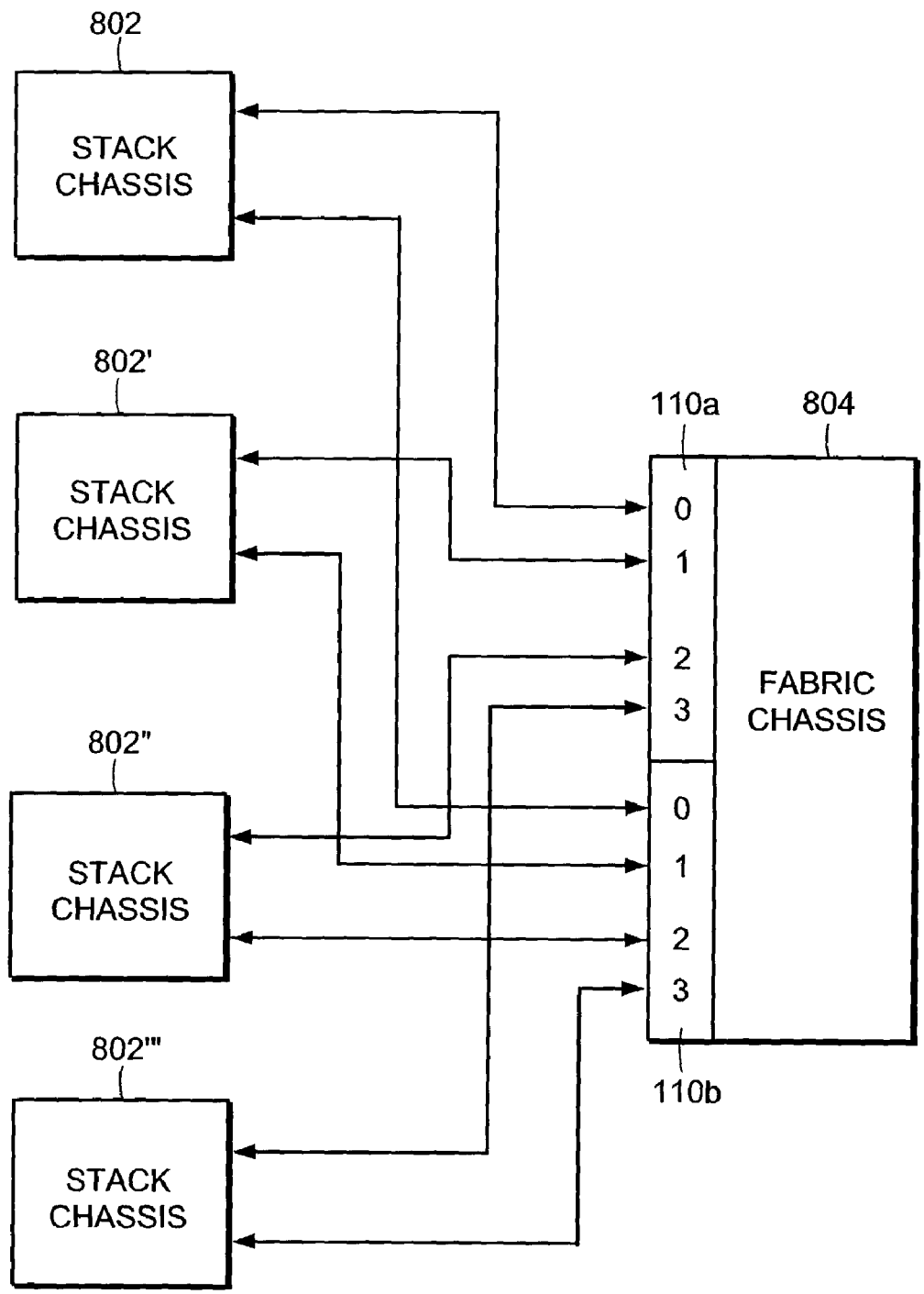
FIG. 13 is an illustrative block diagram of four stack chassis in communication with a switching fabric chassis, according to one embodiment of the invention.

Referring to FIGS. 12 and 13, the fabric chassis 804 includes two fabric timing modules 110a, 110b. The fabric timing module 110a includes four fabric interfaces 1206a, 1206b, 1206c, 1206d and the fabric timing module 110b includes four fabric interfaces 1206e, 1206f, 1206g, 1206h.

Separate stack chassis 802, 802', 802", 802'" are connected to each of the fabric timing modules 110*a*, 110*b*. The stack chassis 802 connects to the fabric interface 1206*a* and the fabric interface 1206*e*. A stack chassis 802' connects to the fabric interface 1206*b* and the fabric interface 1206*f*. A stack chassis 802" connects to the fabric interface 1206*c* and the fabric interface 1206*g*. A stack chassis 802'" is connected to the fabric interface 1206*d* and the fabric interface 1206*h*.

This architecture enables the four stack chassis 802, 802', 802", 802'" and the fabric chassis 804 to be stacked together in a rack (similar to the rack shown in FIG. 1). In other embodiments, more or less stack chassis 802 connect to the fabric chassis 804. In still other embodiments, a combination of 4U and 2U stack chassis connect to the fabric chassis 804. The benefits of this multiple node stacking architecture include lower overall power consumption by components, compact size of the overall rack system, less heat production by the overall rack system, lower cost of maintenance, and expandability.

Fabricless Configuration

Figure 14:
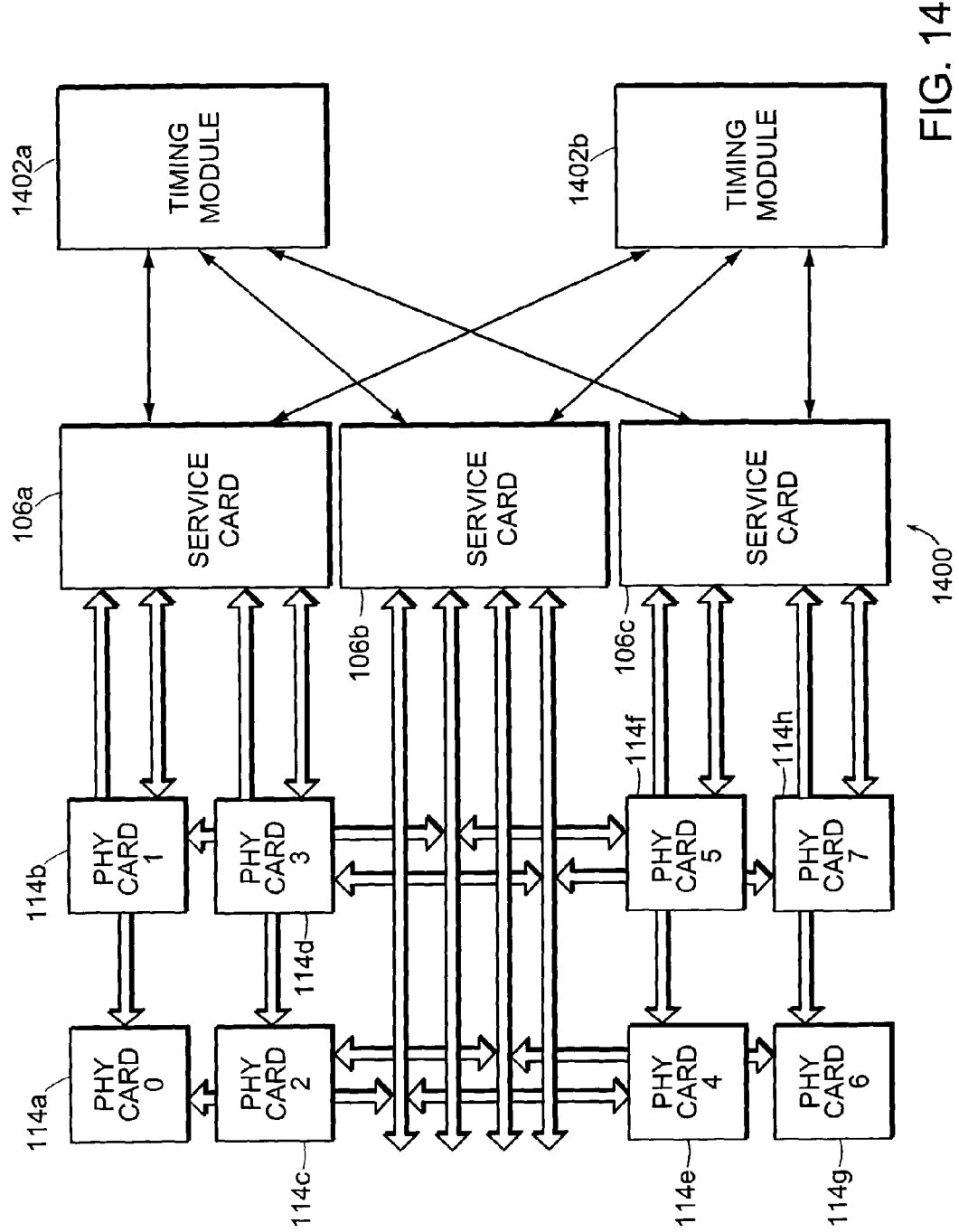
FIG. 14 is an illustrative block diagram of a 4U stack chassis utilizing a fabricless (standalone) architecture, according to one embodiment of the invention.

In other embodiments, as previously mentioned, a single 4U stack chassis or a single 2U stack chassis may operate without being connected to a separate fabric chassis. This configuration is referred to as a fabricless or standalone configuration. FIG. 14 shows an embodiment of a single 4U stack chassis 1400 including eight half-width PHY cards 114*a*-114*h*, three service cards 106*a*, 106*b*, 106*c*, and two timing modules 1402*a*, 1402*b*. The 4U stack chassis 1400 functions similar to a 4U stack chassis in a rack system (discussed in detail above) except that the timing modules 1402*a*, 1402*b* are not in communication with an external fabric chassis.

Figure 15:
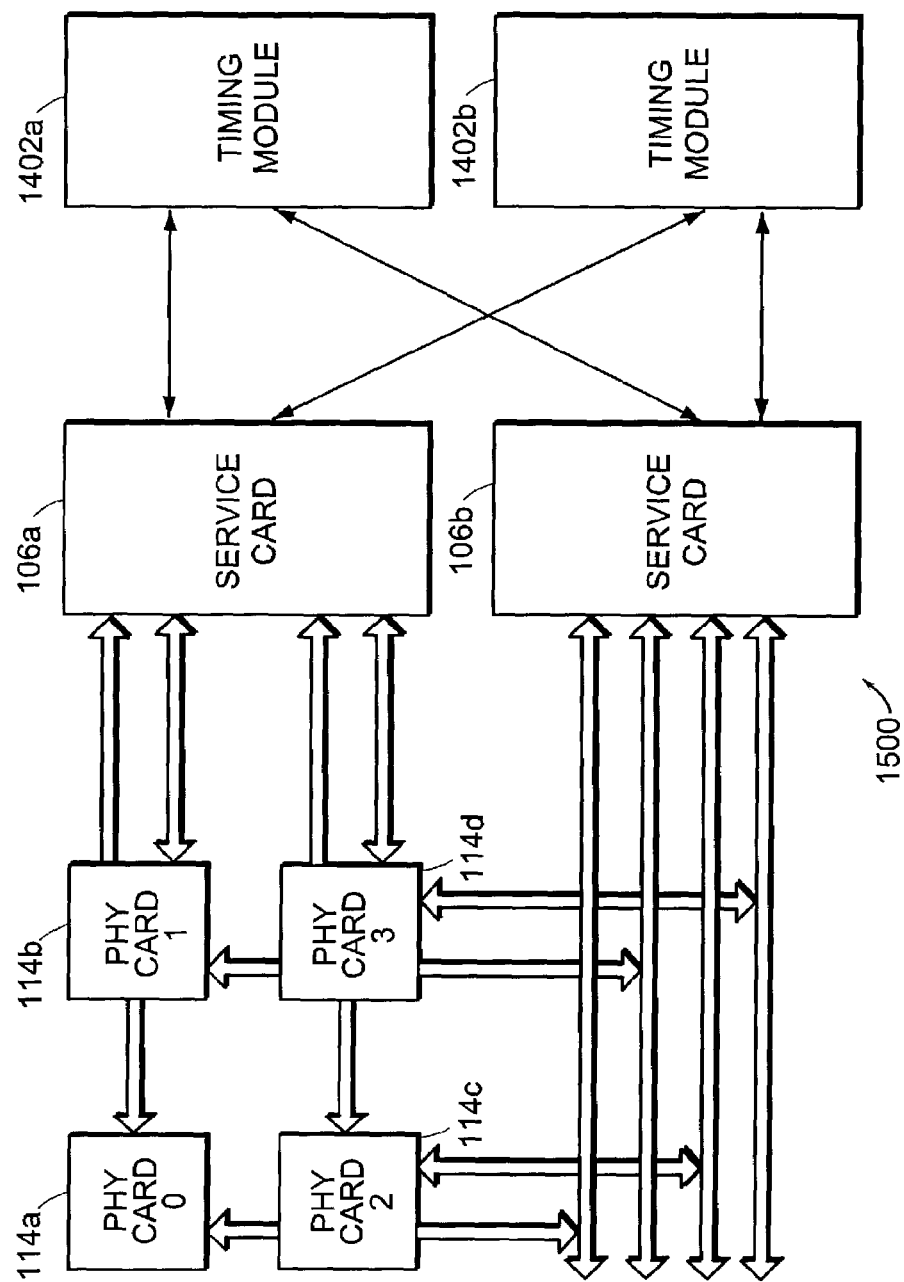
FIG. 15 is an illustrative block diagram of a 2U stack chassis utilizing a fabricless (standalone) architecture, according to one embodiment of the invention.

FIG. 15 shows an embodiment of a single 2U stack chassis 1500 including four half-width PHY cards 114*a*-114*d*, three service cards 106*a*, 106*b*, 106*c*, and two timing modules 1402*a*, 1402*b*. The 2U stack chassis 1500 functions similar to a 2U stack chassis in a rack system (discussed in detail above) except that the timing modules 1402*a*, 1402*b* are not in communication with an external fabric chassis.

Variations, modifications, and other implementations of what is described herein may occur to those of ordinary skill in the art without departing from the spirit and scope of the invention. Accordingly, the invention is not to be defined only by the preceding illustrative description.

What is claimed is:

1. A telecommunication switch, comprising:
a first service card for processing a plurality of packets;
a first physical layer adapter card for transmitting and receiving the plurality of packets, the first physical layer adapter card being in communication with a network over a first link and the first service card over a second link for transferring the plurality of packets between the first physical layer adapter card and the first service card;
a second physical layer adapter card for transmitting and receiving the plurality of packets, the second physical layer adapter card being in communication with the network over the first link and the first service card over a third link for transferring the plurality of packets between the second physical layer adapter card and the first service card thereby providing redundant functionality for the first physical layer adapter card;
a second service card for processing the plurality of packets and being in communication with the first physical layer adapter card over a fourth link for transferring the plurality of packets between the second service card and the first physical layer adapter card; the second service card also being in communication with the second physical layer adapter card over a fifth link for transferring the plurality of packets between the second service card and the second physical layer adapter card thereby providing redundant functionality for the first service card;
a first timing module for providing a plurality of timing signals, the first timing module being in communication with the first service card over a sixth link and being in communication with the second service card over a seventh link;
a second timing module for providing the plurality of timing signals, the second timing module being in communication with the first service card over an eighth link and being in communication with the second service card over a ninth link thereby providing redundant timing functionality for the first timing module; and
a controller in communication with the first and second physical layer adapter cards, the first and second service cards, and the first and second timing module, wherein the controller is configured to:
instruct the second physical layer adapter card to become active responsive to one of the first physical layer card failing, the Automatic Protection Switching occurring on the first link, the second link failing, and combinations thereof; and
instruct the second service card to become active responsive to the first service card failing
wherein the first and second service cards and the first and second timing modules each utilize a redundant active/protection architecture;
wherein the first and second physical layer adapter card utilize Automatic Protection Switching in communication with the network on the first link with the first and second physical layer adapter card processing the same plurality of packets;
wherein the controller is configured to control data flow between the first timing module and between the second timing module by balancing the transfer of the plurality of packets between the first and second service cards and the first and second timing module cards responsive to the integrity of links between the first and second service cards and the first and second timing module cards; and
wherein the first and second service cards, first and second timing modules, the first and second physical layer adapter cards, and the controller are located in a chassis.

2. The telecommunication switch of claim 1 wherein each of the first and second physical layer adapter cards comprise four port DS3 physical layer adapter cards.

3. The telecommunication switch of claim 1 wherein each of the first and second physical layer adapter cards comprise four port OC3 physical layer adapter cards.

4. The telecommunication switch of claim 1 wherein each of the first and second physical layer adapter cards comprise one port OC12 physical layer adapter cards.

5. The telecommunication switch of claim 1 wherein each of the first and second physical layer adapter cards comprise one port OC48 physical layer adapter cards.

6. The telecommunication switch of claim 1 wherein each of the first and second physical layer adapter cards comprise four port OC12 physical layer adapter cards.

7. The telecommunication switch of claim 1 wherein each of the first and second physical layer adapter cards comprise twelve port DS3 physical layer adapter cards.

8. The telecommunication switch of claim 1 wherein the service card comprises a packet forwarding module card.

9. The telecommunication switch of claim 1 wherein the service card comprises a high speed packet forwarding module card.

10. The telecommunication switch of claim 1 wherein the first and second timing modules comprise stack timing modules.

11. The telecommunication switch of claim 1 wherein the first and second timing modules comprise fabric timing modules.

12. A system for balancing data flow within a network switch, comprising:

a service card for processing a plurality of packets;

a first timing module comprising an input interface and an output interface, the input interface of the first timing module being in communication with the service card over a first plurality of links for transferring the packets between the service card and the first timing module;

a second timing module comprising an input interface and an output interface, the input interface of the second timing module being in communication with the service card over a second plurality of links for transferring the packets between the service card and the second timing module thereby providing a redundant functionality for the first timing module;

a plurality of physical adapter cards connected to the service card over a third plurality of links, wherein the plurality of physical adapter cards are configured to communicate the plurality of packets to a network utilizing Automatic Protection Switching; and a processor in communication with the first timing module and the second timing module, the processor controlling data flow between the first timing module input and output interfaces and between the second timing module input and output interfaces by balancing the transfer of the plurality of packets between the first plurality of links and the second plurality of links depending on the integrity of the first and second pluralities of links;

wherein the service card, first and second timing modules, the plurality of physical adapter cards, and the processor are located in a chassis.

13. The system of claim 12 wherein the service card is a first service card and further comprising a second service card in the chassis for processing a plurality of packets, the second service card being in communication with the input interface of the first timing module over a fourth plurality of links for transferring the packets between the second service card and the first timing module, the second service card also being in communication with the input interface of the second timing module over a fifth plurality of links for transferring the packets between the second service card and the second timing module, the processor controlling data flow between the first timing module input and output interfaces and between the second timing module input and output interfaces by balancing the transfer of the plurality of packets between the fourth plurality of links and the fifth plurality of links;

wherein the first and second service cards utilize a redundant active/protection architecture;

wherein the plurality of physical adapter cards connect to the second service card over a sixth plurality of links;

wherein the processor is in communication with the first and second service cards and the plurality of physical adapter cards, and the processor is further configured to control redundancy of the first and second service cards and the plurality of physical adapter cards; and wherein the first, second, fourth, and fifth plurality of links comprise a mesh of links between the first and second service cards and the first and second timing modules, the mesh of links is configured to provide link redundancy internal to the chassis.

14. A system for enabling chassis stacking in a rack system, comprising:

a fabric comprising:

a first plurality of bi-directional fabric interfaces for transmitting and receiving a plurality of packets;

a second plurality of bi-directional fabric interfaces for transmitting and receiving the plurality of packets; and a plurality of chassis, each of the plurality of chassis comprising:

a first stack timing module comprising a bi-directional data interface being in communication with one of the first plurality of fabric interfaces over a first plurality of links for transferring the plurality of packets between the first stack timing module and the fabric;

a second stack timing module comprising a bi-directional data interface being in communication with one of the second plurality of fabric interfaces over a second plurality of links for transferring the plurality of packets between the second stack timing module and the fabric;

a first service card for processing the plurality of packets comprising a bi-directional data interface being in communication with the first stack timing module over a third plurality of links and in communication with the second stack timing module over a fourth plurality of links;

a second service card for processing the plurality of packets comprising a bi-directional data interface being in communication with the first stack timing module over a fifth plurality of links and in communication with the second stack timing module over a sixth plurality of links;

wherein the first, second, third, fourth, fifth and sixth plurality of links comprise a mesh of links between the first and second service cards and the first and second timing modules, the mesh of links is configured to provide link redundancy internal to the fabric;

a plurality of physical adapter cards connected to the fabric with redundant links, wherein the plurality of physical adapter cards are configured to communicate the plurality of packets to a network utilizing Automatic Protection Switching.

* * * * *